United States Patent
Tojo

(10) Patent No.: US 8,797,381 B2
(45) Date of Patent: Aug. 5, 2014

(54) IMAGE PROCESSING APPARATUS AND IMAGE PROCESSING METHOD

(75) Inventor: Hiroshi Tojo, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 662 days.

(21) Appl. No.: 12/684,012

(22) Filed: Jan. 7, 2010

(65) Prior Publication Data

US 2010/0177159 A1    Jul. 15, 2010

(30) Foreign Application Priority Data

Jan. 9, 2009    (JP) ................................. 2009-003663

(51) Int. Cl.
*H04N 5/232*    (2006.01)
*G06K 9/00*    (2006.01)

(52) U.S. Cl.
USPC ..................... 348/14.16; 348/180; 348/229.1; 348/240.1; 348/345; 348/370; 382/103; 382/107; 382/209; 382/228; 382/254; 396/55; 396/122; 396/234; 706/46; 715/856

(58) Field of Classification Search
CPC ............ H04N 7/142; H04N 5/22; H04N 5/13
USPC ......... 340/435, 539.1; 348/14.16, 180, 229.1, 348/240.1, 345, 370; 356/3.08; 378/19; 382/103, 106, 254, 107, 209, 228; 396/55, 122, 234; 701/469; 706/46; 715/856

See application file for complete search history.

(56) References Cited

U.S. PATENT DOCUMENTS

| | | | | |
|---|---|---|---|---|
| 5,033,378 A | * | 7/1991 | Ebihara ......................... | 101/152 |
| 5,448,610 A | * | 9/1995 | Yamamoto et al. ............. | 378/19 |
| 6,055,041 A | * | 4/2000 | Matsumoto et al. ......... | 356/3.08 |
| 6,226,409 B1 | * | 5/2001 | Cham et al. .................... | 382/228 |
| 6,477,260 B1 | * | 11/2002 | Shimomura ................... | 382/106 |
| 6,828,903 B2 | * | 12/2004 | Watanabe et al. ............. | 340/435 |
| 7,489,335 B2 | * | 2/2009 | Kochi et al. ................... | 348/180 |
| 7,532,111 B2 | * | 5/2009 | LaRue ........................ | 340/539.1 |
| 7,643,739 B2 | * | 1/2010 | Sasaki et al. .................... | 396/55 |
| 7,860,273 B2 | * | 12/2010 | Kochi et al. ................... | 382/103 |
| 7,889,985 B2 | * | 2/2011 | Misawa et al. ................ | 396/122 |
| 8,059,186 B2 | * | 11/2011 | Nakahara ...................... | 348/345 |
| 8,126,210 B2 | * | 2/2012 | Fardi ............................. | 382/106 |
| 8,379,931 B2 | * | 2/2013 | Tojo et al. ..................... | 382/107 |
| 2002/0064382 A1 | * | 5/2002 | Hildreth et al. ............... | 396/100 |
| 2003/0103647 A1 | * | 6/2003 | Rui et al. ....................... | 382/103 |

(Continued)

FOREIGN PATENT DOCUMENTS

| | | |
|---|---|---|
| JP | 60-208184 A | 10/1985 |
| JP | 2005-294951 A | 10/2005 |
| JP | 2007-189717 A | 7/2007 |

*Primary Examiner* — Gerald Gauthier

(74) *Attorney, Agent, or Firm* — Canon U.S.A., Inc. IP Division

(57) ABSTRACT

An image processing apparatus includes a photographing unit configured to generate a plurality of images by photographing a plurality of times a range which can be photographed, an object detection unit configured to detect a specified object from each of the plurality of images generated by the photographing unit, a position determination unit configured to determine an existing position of the specified object based on a detection result of the specified object in the plurality of images, and a range determination unit configured to determine a photographing range to be photographed within the range which can be photographed based on the existing position of the specified object determined by the position determination unit.

14 Claims, 20 Drawing Sheets

(56) References Cited

U.S. PATENT DOCUMENTS

| | | | |
|---|---|---|---|
| 2003/0146901 A1* | 8/2003 | Ryan | 345/158 |
| 2004/0052418 A1* | 3/2004 | DeLean | 382/209 |
| 2004/0080663 A1* | 4/2004 | Shiraishi et al. | 348/370 |
| 2006/0215882 A1* | 9/2006 | Ando et al. | 382/106 |
| 2006/0256209 A1* | 11/2006 | Yoshida et al. | 348/229.1 |
| 2006/0284837 A1* | 12/2006 | Stenger et al. | 345/156 |
| 2007/0016372 A1* | 1/2007 | Browne et al. | 701/213 |
| 2007/0242944 A1* | 10/2007 | Mizusawa | 396/234 |
| 2008/0079824 A1* | 4/2008 | Sawachi | 348/240.1 |
| 2008/0095402 A1* | 4/2008 | Kochi et al. | 382/103 |
| 2008/0187234 A1* | 8/2008 | Watanabe et al. | 382/254 |
| 2009/0030865 A1* | 1/2009 | Sawada | 706/46 |
| 2010/0177159 A1* | 7/2010 | Tojo | 348/14.16 |
| 2010/0296705 A1* | 11/2010 | Miksa et al. | 382/106 |

\* cited by examiner

BIRD'S EYE VIEW OF
CONFERENCE ROOM

FRAME IMAGE

BIRD'S EYE VIEW OF
CONFERENCE ROOM

FRAME IMAGE

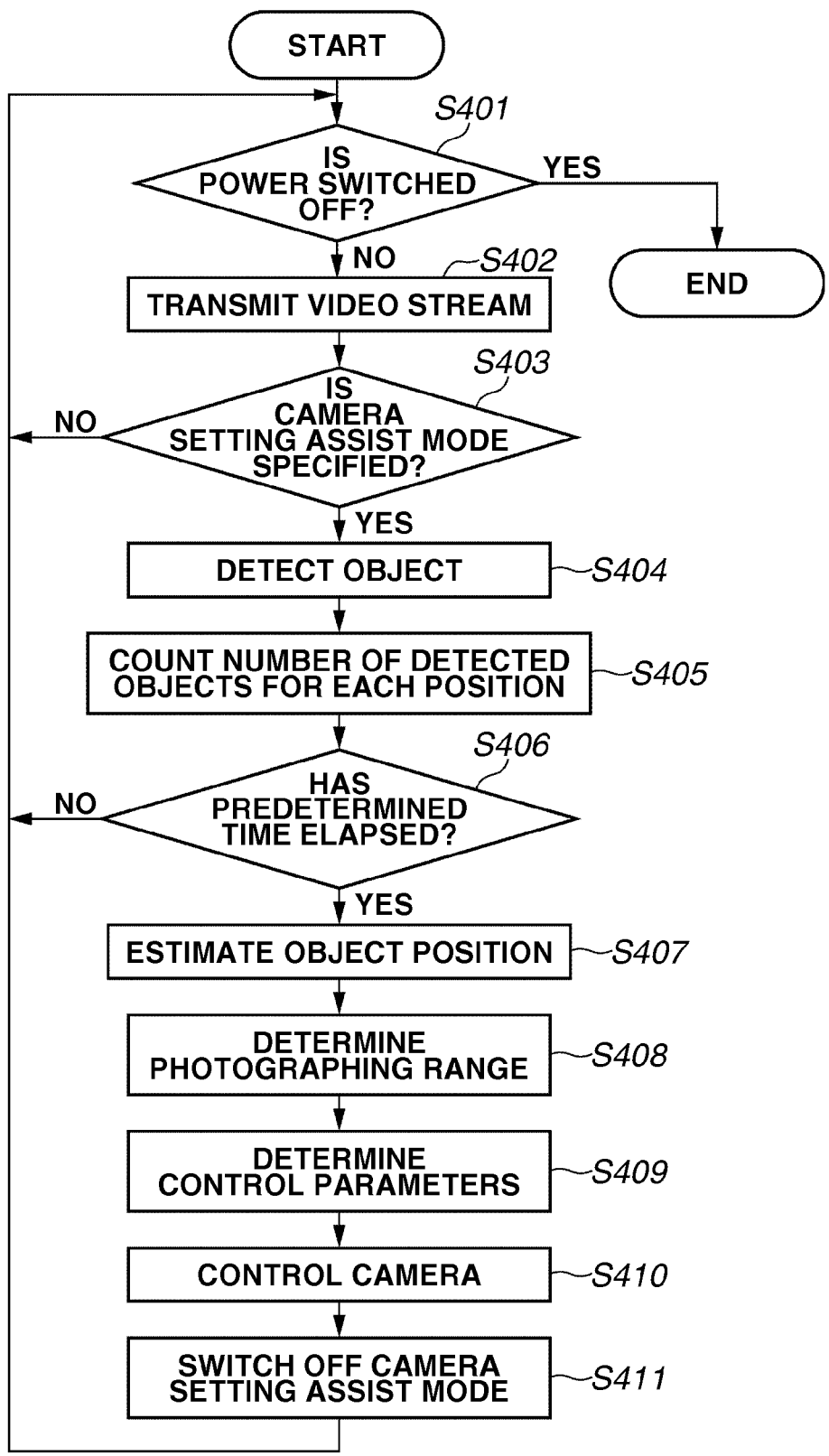

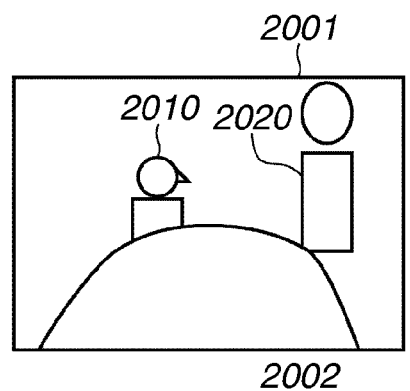
FIG.20A
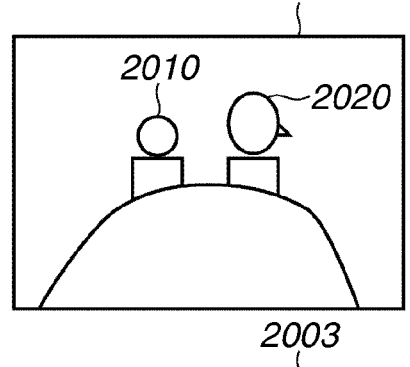
FIG.20B
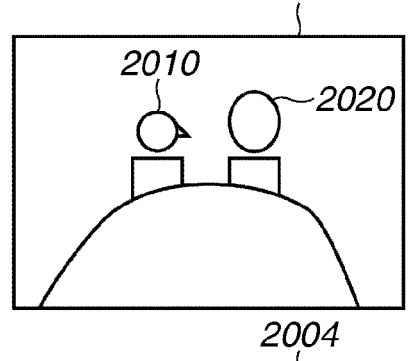
FIG.20C
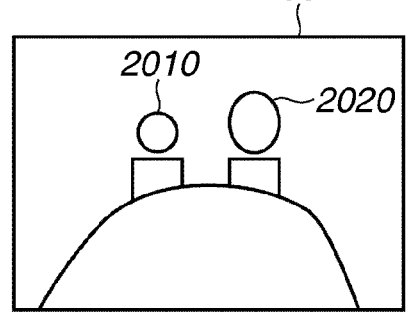
FIG.20D
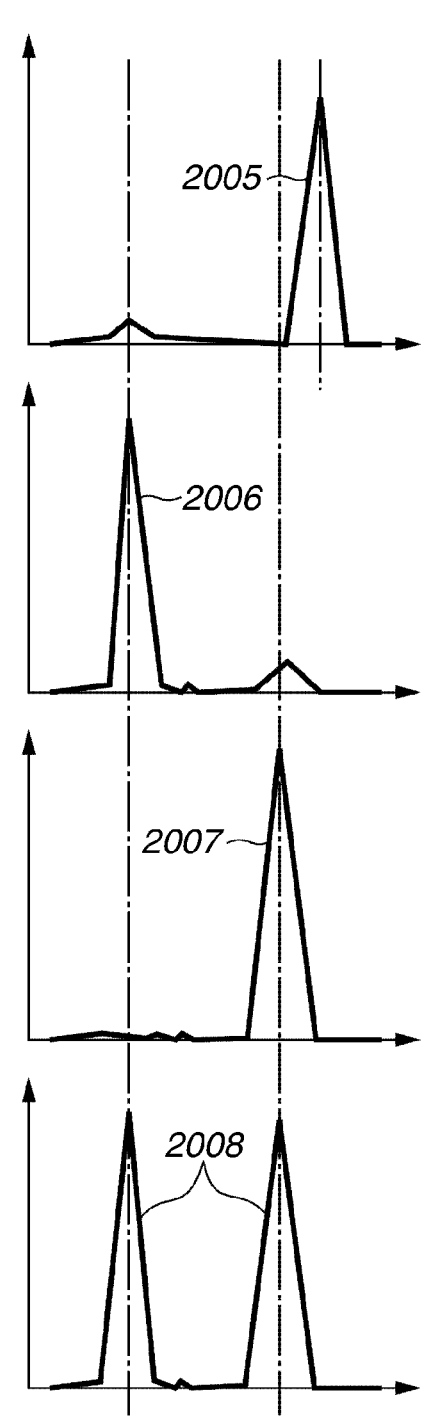

IMAGE PROCESSING APPARATUS AND IMAGE PROCESSING METHOD

BACKGROUND OF THE INVENTION

1. Field of the Invention

The present invention relates to an image processing apparatus and an image processing method. In particular, the present invention relates to a technique for detecting an object and determining a photographing range.

2. Description of the Related Art

Conventionally, there is a technique for detecting an object region and determining and adjusting the photographing range to cover the entire object region (hereinafter to be referred to as auto-framing). For example, Japanese Patent Application Laid-Open No. 60-208184 discusses a technique in which a camera used in a video conference previously photographs a conference room before the start of the conference as a background image. Positions of the participants of the conference are then detected based on a difference between the background image and the image at the start of the conference, and zoom control is thus performed to include all participants of the conference in the photographing range.

Further, Japanese Patent Application Laid-Open No. 2005-294951 discusses a digital image printing system in which a face region is detected, and zoom control is then performed to include the entire face region in the photographing range. Furthermore, Japanese Patent Application Laid-Open No. 2007-189717 discusses a technique for detecting that a person has taken a seat and then once photographing the conference room. If the photographed face position is appropriate, the camera position is adjusted, and the camera then waits for a photograph instruction to be input by a user.

In a case where the video conference is about to begin, the person to be the object is busy preparing for the conference and may not be fully conscious of the camera, so that the person may face down or sideways. However, since the face can only be detected when facing the front in face detection, the face becomes undetected in the above-described case.

Further, other objects in the conference room may be erroneously detected as the face of a person during the conference. Furthermore, if the object moves, an object position may not be correctly detected. To solve such problems, it becomes necessary for the participants (i.e., objects) to stare at the camera without moving, which is burdensome for the users of the video conference system.

Moreover, in the case of a video conference, the participants each behave differently from arrival at the conference room to being seated. Conventionally, it thus becomes necessary for the user to instruct auto-framing to start after all participants have sat down and it is confirmed that they are all looking at the camera.

Originally, auto-framing is advantageous in that the users can perform other tasks such as preparation for the conference while auto-framing is being performed. It is thus desirable for auto-framing to always be performed appropriately when the user instructs auto-framing to start at any given timing.

In response to such a demand, Japanese Patent Application Laid-Open No. 2007-189717 discusses a technique in which auto-framing is performed after it has been detected that the participants have sat down. However, if the user instructs auto-framing to start when the participants are already sitting down, the auto-framing cannot be started as the participants continue to be seated. Further, since all participants may not be looking at the camera even when they are seated, the positions of all participants may not be correctly detected.

Furthermore, if the technique is to detect whether the participants have sat down, the technique cannot adapt to a case where there are participants that are standing due to a lack of chairs. Moreover, such a technique cannot apply to a case where all participants are standing, or there are participants sitting in the front row and standing in the back row, such as when taking a group photograph.

SUMMARY OF THE INVENTION

The present invention is directed to an image processing apparatus capable of detecting an object at high speed in a wide range and in detail.

According to an aspect of the present invention, an image processing apparatus includes a photographing unit configured to generate a plurality of images by photographing a plurality of times a range which can be photographed, an object detection unit configured to detect a specified object from each of the plurality of images generated by the photographing unit, a position determination unit configured to determine an existing position of the specified object based on a detection result of the specified object in the plurality of images, and a range determination unit configured to determine a photographing range to be photographed within the range which can be photographed based on the existing position of the specified object determined by the position determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a flowchart of an example of a process for performing auto-framing according to the first exemplary embodiment.

FIGS. 20A, 20B, 20C, and 20D illustrate an example of determining whether an object position is stable according to the fourth exemplary embodiment.

DESCRIPTION OF THE EMBODIMENTS

Various exemplary embodiments, features, and aspects of the invention will be described in detail below with reference to the drawings.

A case where an image processing apparatus according to the exemplary embodiments of the present invention is applied to a video conference system will be described below.

Figure 1:
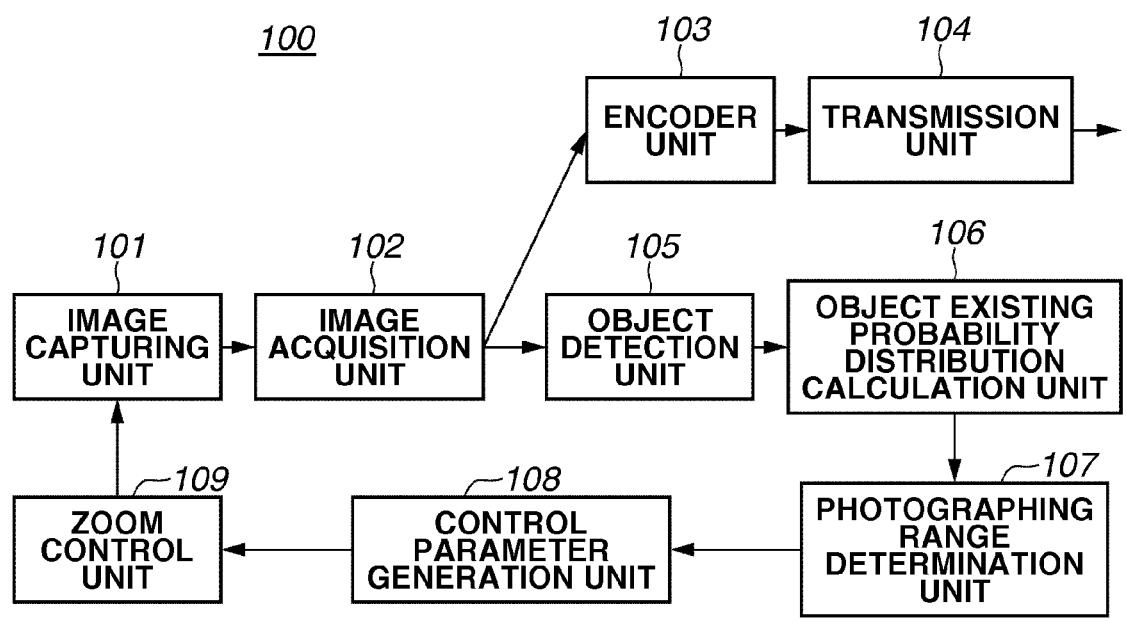
FIG. 1 illustrates a block diagram of a functional configuration of an image processing apparatus according to a first exemplary embodiment of the present invention.

FIG. 1 illustrates a block diagram of an example of a functional configuration of an image processing apparatus 100 according to the first exemplary embodiment of the present invention.

Referring to FIG. 1, an image capturing unit 101 inputs video data. An image acquisition unit 102 acquires frame images from the video data received from the image capturing unit 101.

An encoder unit 103 encodes the frame images acquired by the image acquisition unit 102 according to a predetermined encoding method. A transmission unit 104 transmits an encoded video stream, and when the video stream is received by an apparatus which includes a decoder and a display, the user can view the video image captured by the image processing apparatus 100.

An object detection unit 105 detects the object from the frame image acquired by the image acquisition unit 102. An object existing probability distribution calculation unit 106 counts the detection results of the object detection unit 105 and calculates an object existing probability distribution at each position. A photographing range determination unit 107 determines the range in which all objects can be included, based on the object existing probability distribution calculated by the object existing probability distribution calculation unit 106.

A control parameter generation unit 108 determines a control parameter (i.e., a zoom position) of the image capturing unit 101 based on the photographing range determined by the photographing range determination unit 107. Further, a zoom control unit 109 performs zoom control of the image capturing unit 101 based on the control parameter (i.e., the zoom position).

Figure 3A:
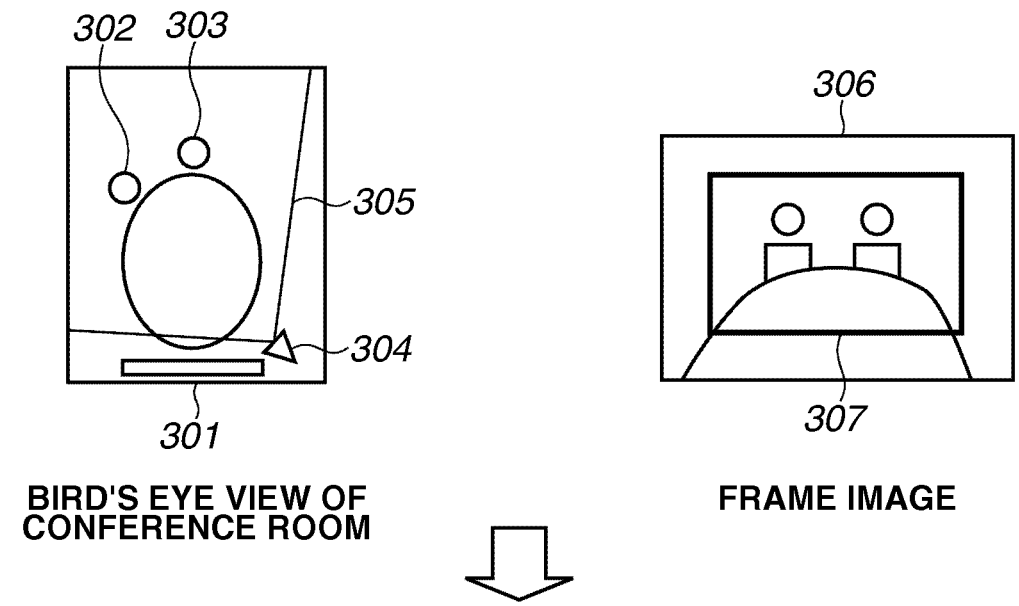
FIGS. 3A and 3B illustrate schematic diagrams of the conference room.
Figure 3B:
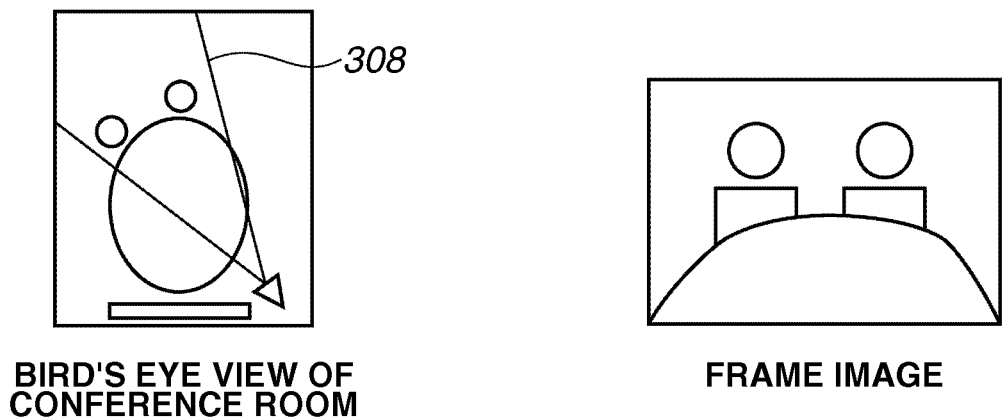

A process flow according to the present exemplary embodiment will be described below with reference to the schematic diagrams of operations illustrated in FIGS. 3A and 3B and the flowchart illustrated in FIG. 4. FIGS. 3A and 3B illustrate schematic diagrams of the conference room.

Referring to FIG. 3A, conference participants 302 and 303 and an image processing apparatus 304 according to the present exemplary embodiment are inside a conference room 301. A display which displays the video image and a table are also installed in the conference room.

Before starting the video conference, the user places the image processing apparatus 304 alongside the display as illustrated in FIG. 3A, so that the eyes of the participants in the conference room are level with the eyes of participants to communicate with on the other side. The user switches on the image processing apparatus 304 which then operates according to the flowchart illustrated in FIG. 4.

Step S401 is an end determination step, and the processes of step S402 to step S411 are repeated until an instruction to switch the power off is issued.

In step S402, the image acquisition unit 102 acquires the video image received by the image capturing unit 101 as the frame image. The encoder unit 103 then encodes the frame image into formats such as Moving Picture Experts Group (MPEG)-1, MPEG-2, and Motion-Joint Photographic Experts Group (JPEG) formats. The transmission unit 104 transmits the encoded result as the video stream.

In step S5403, the image acquisition unit 102 determines whether the image processing apparatus 100 is currently set to a camera setting assist mode. If the image processing apparatus 100 is not set the camera setting assist mode (NO in step S403), the process returns to step S401. The camera setting assist mode is a mode for automatically adjusting the photographing range to include all objects existing in front of the camera (i.e., perform framing). The image processing apparatus 100 can automatically shift to the camera setting assist mode when the power is switched on, or at arbitrary timing by the user operating a button (not illustrated).

When the image processing apparatus 100 shifts to the camera setting assist mode, the image capturing unit 101 is controlled toward the wide-angle end (not illustrated in FIGS. 3A and 3B). A viewing angle 305 indicates a viewing angle in such a case, and the participants are captured small in a frame image 306.

The operation of the camera setting assist mode is described from step S404 to step S409. If it is determined that the present setting is the camera setting assist mode (YES in step S403), the process proceeds to step S404. In step S404, the object detection unit 105 detects the object from the frame image. There are various methods for detecting the object, and in the present exemplary embodiment, the face of the object is detected. Face detection will be described in detail below.

In step S405, the object existing probability distribution calculation unit 106 counts the number of detected objects at respective positions within the frame. A histogram of the detected number of the objects with respect to the position is then generated.

In step S406, the object existing probability distribution calculation unit 106 determines whether a predetermined time has elapsed. If the predetermined time has elapsed (YES in step S406), the process proceeds to step S407. On the other hand, if the predetermined time has not elapsed (NO in step S406), the process returns to step S401.

In step S407, the object existing probability distribution calculation unit 106 calculates the object position existing probability distribution and then acquires a region in which the object existing probability is high from the calculated object position existing probability distribution. The process for acquiring such a region in which the object existing probability is high will be described in detail below. In step S408, the photographing range determination unit 107 determines a photographing range 307 of the object as illustrated in FIG. 3A.

In step S409, the control parameter generation unit 108 determines the control parameter (i.e., zoom position or focal length) so that the range in which the object exists can cover the entire frame. Such a control parameter can be determined by calculating the number by which the area of the object existing range is to be multiplied to equal the area of the frame, and then converting the result into the focal length. For example, if the area of the range in which the object exists is to be doubled when using a lens of 10 mm at the wide-angle end, the focal length becomes 20 mm.

In step S410, the zoom control unit 109 performs zoom control on the image capturing unit 101 based on the determined zoom position. As a result, an angle of view 308 as illustrated in FIG. 3B is achieved. In step S411, the camera setting assisting is completed, so that the zoom control unit 109 turns off the camera setting assist mode, and the process returns to step S401.

The face detection process will be described in detail below. The present exemplary embodiment describes applying a method for detecting a face pattern in an image by using a neural network discussed in Rowley et al., "Neural network-based face detection", IEEE TRANSACTIONS ON PATTERN ANALYSIS AND MACHINE INTELLIGENCE, VOL. 20, NO. 1, JANUARY 1998.

Image data from which the face is to be detected is read from a memory, and a region to be matched with the face is cut out from the read image. An operation employing the neural network is then performed using a distribution of the pixel values in the cut out region. Weights and threshold values of the neural network have been previously learned for a large number of face patterns and non-face patterns. For example, if the operation result achieved by using the neural network is greater than or equal to 0, the region is determined as the face, and if the operation result is other than the above, the region is determined as not a face.

Figure 7:
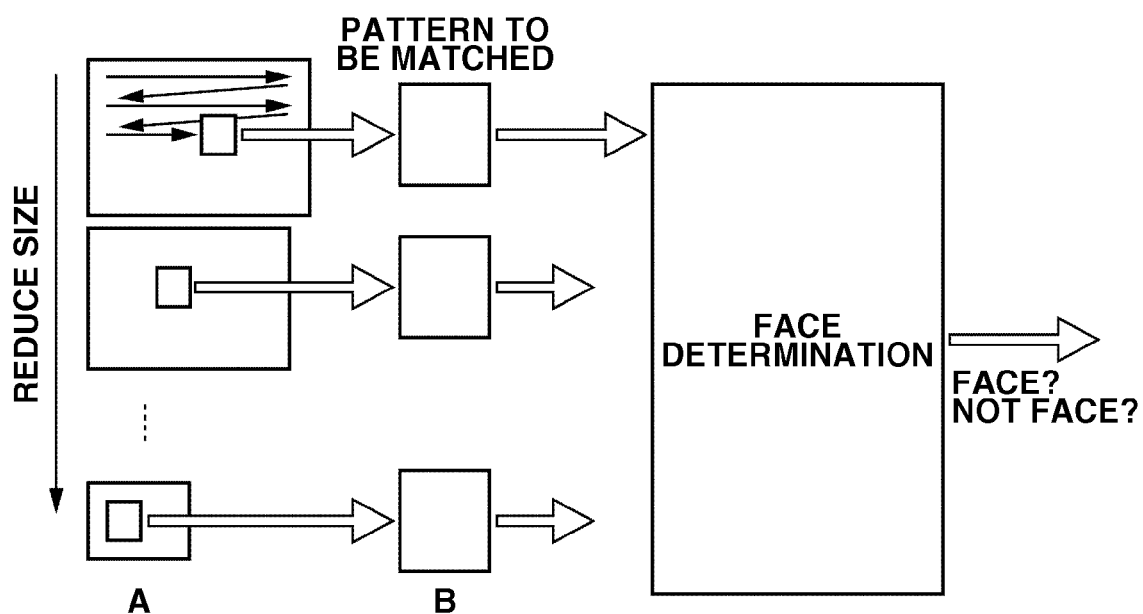
FIG. 7 illustrates an outline of detecting a face pattern.

The position of the cut out region of the image pattern to be matched with the face is then sequentially scanned in vertical and horizontal directions in the entire image region as illustrated in FIG. 7. The face is thus detected from the image. Further, the size of the read image is sequentially reduced at a predetermined rate and then scanned as described above to detect the face, so that faces of various sizes can be detected. The method for detecting the face from the image is not limited to the method which employs the neural network. For example, various methods discussed in Viola and Jones, "Rapid Object Detection using Boosted Cascade of Simple Features", Proceedings of the IEEE Conference on Computer Vision and Pattern Recognition (CVPR '01) are also applicable.

The process for calculating the object existing probability distribution and determining the object position (i.e., series of processes in step S405 to step s407 illustrated in FIG. 4) will be described in detail below. The process for calculating the object existing probability distribution will be described one-dimensionally in a horizontal direction instead of in two dimensions as in the frame image for ease of description.

Figure 6:
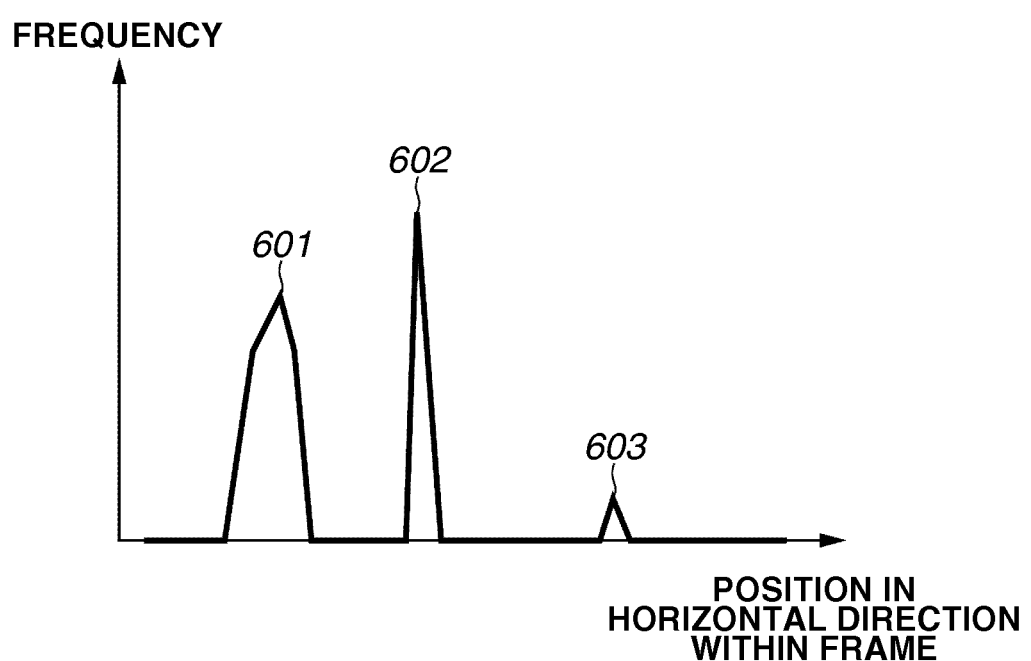
FIG. 6 illustrates an example of an object existing probability distribution according to the first exemplary embodiment.

The outline of the object existing probability distribution will be described below with reference to FIG. 6. FIG. 6 illustrates an example of an object existing probability distribution according to the present exemplary embodiment. Referring to FIG. 6, the position in the horizontal direction of the frame is indicated on the horizontal axis, and the number of face detection within a predetermined time is indicated on the vertical axis.

A first peak 601 is spread due to movement of the object, and a second peak 602 is lean due to the object being stationary. A third peak 603 is small due to an erroneous detection. By acquiring such peaks of the probability distribution of the object existing in a position within the frame, the position at which the probability of the object actually exists is high is acquired.

Figure 5:
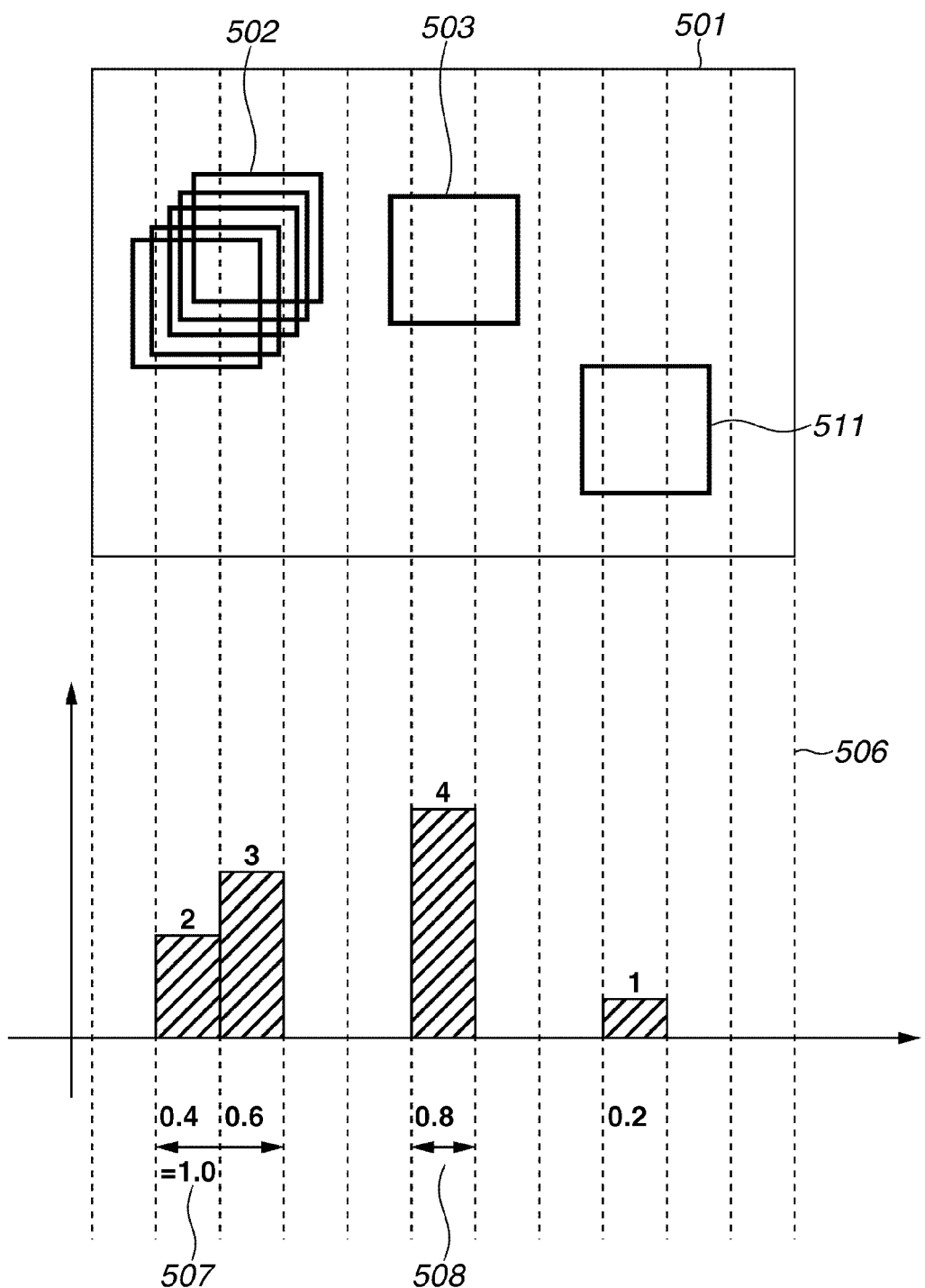
FIG. 5 illustrates an outline of generating a histogram from results of face detection according to the first exemplary embodiment.

The calculation process will be described in detail below. FIG. 5 illustrates a schematic diagram of generating a histogram from the results of face detection. Referring to FIG. 5, results of detecting the face five times within a predetermined time are drawn on top of each other, and ten face regions are detected. The objects in the example are two persons, and since the objects moved, the five face regions are gradually shifted in a face region group 502. On the other hand, the objects hardly moved in a face region 503, and since the face was not detected in one of the five face detections, four face regions are thus detected. Further, a face region 511 indicates an erroneous detection.

Furthermore, as illustrated in FIG. 5, a side in the horizontal direction of the frame image 501 is divided into a predetermined number of bins to create a histogram. If the center of the face region is included in a bin, the frequency of face detection for the bin is counted as 1. A histogram 506 illustrated in FIG. 5 is thus created by calculating as described above. In the example illustrated in FIG. 5, the size of all face regions are the same. If various sizes exist, histograms are created for a face region of each size. As a result, the photographing range can be appropriately determined as will be described below.

The probability of the (center of the) face region existing in each bin can then be acquired by dividing the frequency in the bin of the histogram by the number of times of face detection is performed (i.e., 5 times in the example illustrated in FIG. 5). A peak in which the object existing probability is high is then extracted from the calculated object existing probability distribution. More specifically, the values of the object existing probability corresponding to each bin are added and integrated, and a value which is greater than or equal to the threshold value is searched. Since the existing probability becomes higher as it becomes nearer to 1, a value close to 1 (e.g., 0.8) is employed as the threshold value. The object can be in various states as face detection takes a longer time. For example, the direction of the face may change from facing the front, so that the face often becomes undetectable. In such a case, it is more appropriate to set a smaller value to the threshold value.

The number of bins (i.e. peak width) in which the values of the object existing probability distribution can be added is set within a predetermined value. This prevents a gentle slope to be erroneously detected as a peak. Further, if face detection is to be performed more accurately, it becomes necessary to define the relation between the peak width (i.e., number of bins) and the peak value (the maximum value of the existing probability in the focused bin). The method for extracting the peak is not limited to the above, and various methods such as using a Gaussian approximation are applicable. By the above-described method, a first peak 507 and a second peak 508 illustrated in FIG. 5 are extracted.

Figure 12:
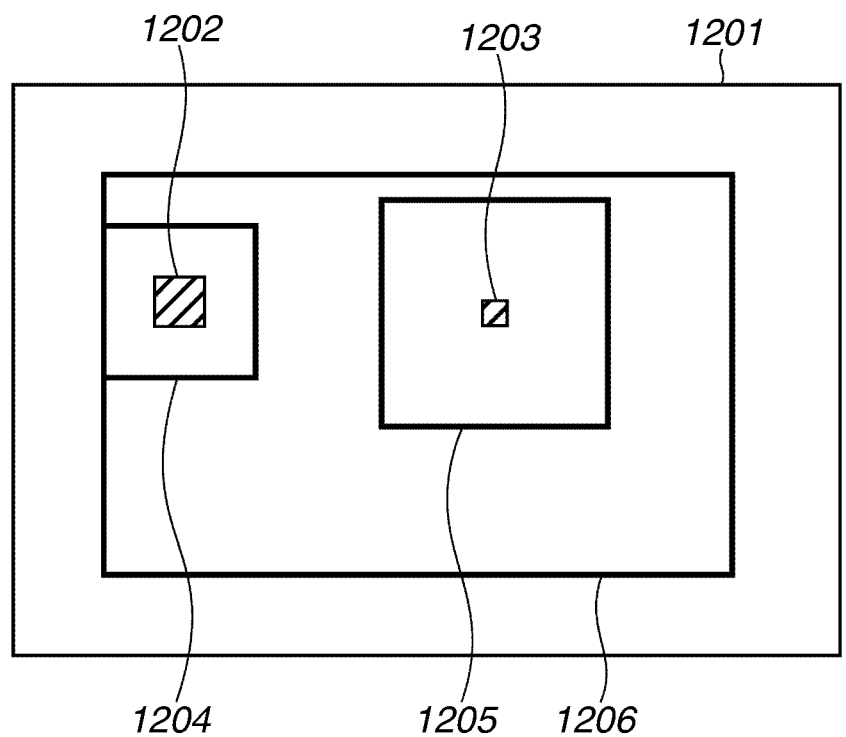
FIG. 12 illustrates an outline of a method for determining a photographing range according to the first exemplary embodiment.

In step S408, the photographing range is determined to include all regions in which the object existing probability is high. The process of determining the photographing range will be described in detail below. FIG. 12 illustrates an outline of a method for determining the photographing range.

Referring to FIG. 12, a first shaded portion 1202 and a second shaded portion 1203 are regions in which the object existing probability, calculated using the center of the face region, is high. In FIG. 12, the shaded portions are indicated as rectangles whose sides are peak widths in the vertical direction and the horizontal direction. The size of the face regions are each different in the first shaded region 1202 and the second shaded region 1203. Each shaded portion thus corresponds to the region of high object existing probability, acquired from the object existing probability distribution for the face region of each size. A first region 1204 and a second region 1205 are results of drawing the face regions corresponding to each size.

In drawing the first region 1204 and the second region 1205, it is only necessary for the center of the first region 1204 to be included in the first shaded region 1202 and the center of the second region 1205 to be included in the second shaded region 1203. The simplest method for drawing the face regions is to match each of the centers of the first region 1204 and the second region 1205 with the centers of the first shaded region 1202 and the second shaded region 1203 which are the peak values.

Further, if the object is moving, a determination method described below can be used to include the object in the photographing range as much as possible. When the frame 1201 is equally divided into regions of 2 by 2, the first shaded region 1202 becomes included in the upper left region of the frame 1201. The upper-left vertex of the first shaded region 1202 is thus set as the center of the first region 1204. On the other hand, since the second shaded region 1203 becomes included in the upper right region of the frame 1201, the upper-right vertex of the second shaded region 1203 is set as the center of the second region 1205.

Upon acquiring the regions in which the object existing probability is high as described above, a photographing range 1206 is determined so that all of the first region 1204 and the second region 1205 are included when photographed. The photographing range 1206 is determined, for example, by gradually decreasing only the size of a rectangle whose size, center, and aspect ratio are the same as those of the frame 1201. When one side of either the first region 1204 or the second region 1205 becomes inscribed, the rectangle is set as the photographing range 1206.

Figure 13:
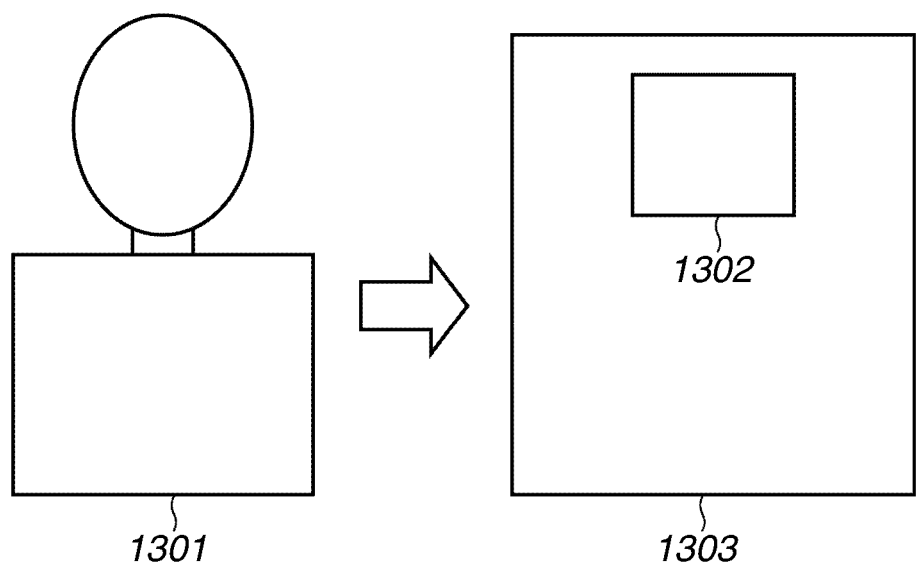
FIG. 13 illustrates an example of a template for determining an upper body region from the face region.

In the above-described method, since the region of the object existing near the side of the frame definitely comes into contact with the frame, a predetermined margin can be set without causing the object region to become inscribed. Further, if a template illustrated in FIG. 13 is used, the photographing range can be determined so that all objects can be photographed in bust shots. More specifically, templates of a face region 1302 and an upper body 1303 as illustrated in FIG. 13 are acquired from a ratio of sizes and relative positions of an upper body and a face of an average person 1301. After the position and the size of the face region are determined, the templates are zoomed and applied to determine the photographing range to include the upper body. All objects can thus be photographed as bust shots.

As described above, according to the present exemplary embodiment, an object is continuously detected for a predetermined time with respect to the same position, and the probability distribution is acquired. The object position of a high probability can thus be acquired. As a result, the load on the user is reduced even when the object is temporarily undetected or erroneously detected, or when the object moves, and an appropriate photographing range can be easily determined and adjusted.

A second exemplary embodiment of the present invention is directed to a method of determining the photographing range when performing pan, tilt, and zoom control.

Figure 2:
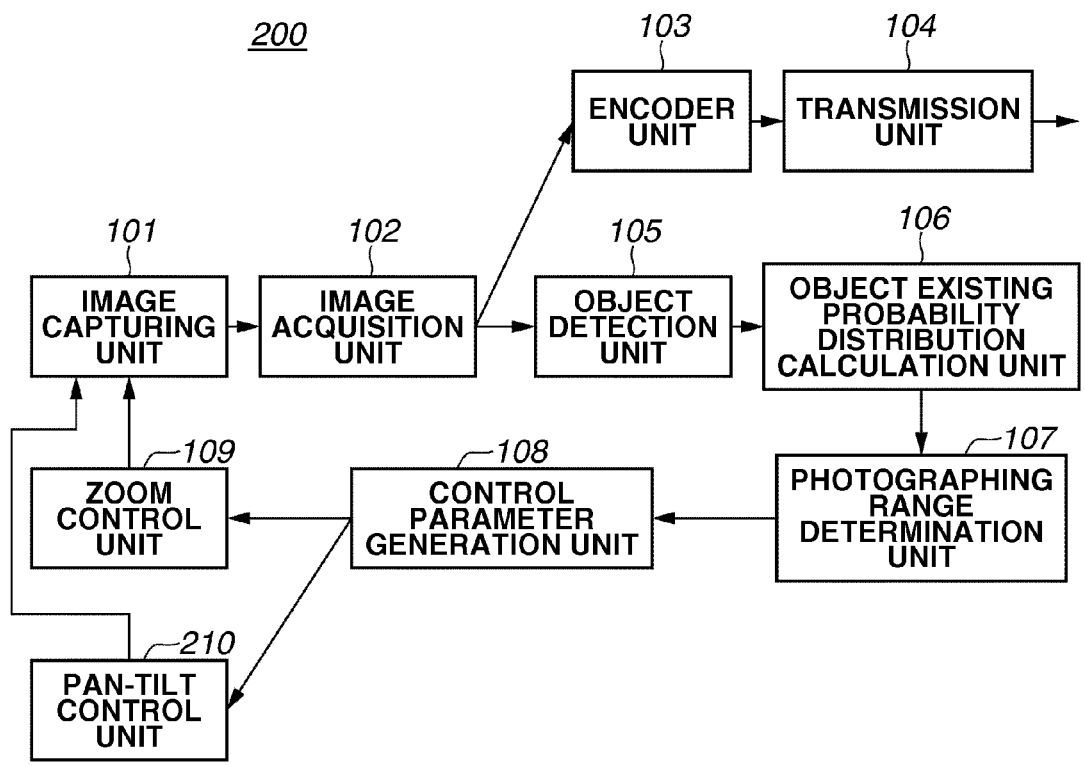
FIG. 2 illustrates a block diagram of a functional configuration of an image processing apparatus according to a second exemplary embodiment of the present invention.

FIG. 2 illustrates a block diagram of an example of a functional configuration of an image processing apparatus according to the second exemplary embodiment. The configuration of the second exemplary embodiment is different from that of the first exemplary embodiment in that a pan-tilt control unit 201 is added for panning and tilting the image capturing unit 101. The configurations in the second exemplary embodiment which are the same as those in the first exemplary embodiment are assigned the same reference numbers, and description on these is omitted.

Figure 8:
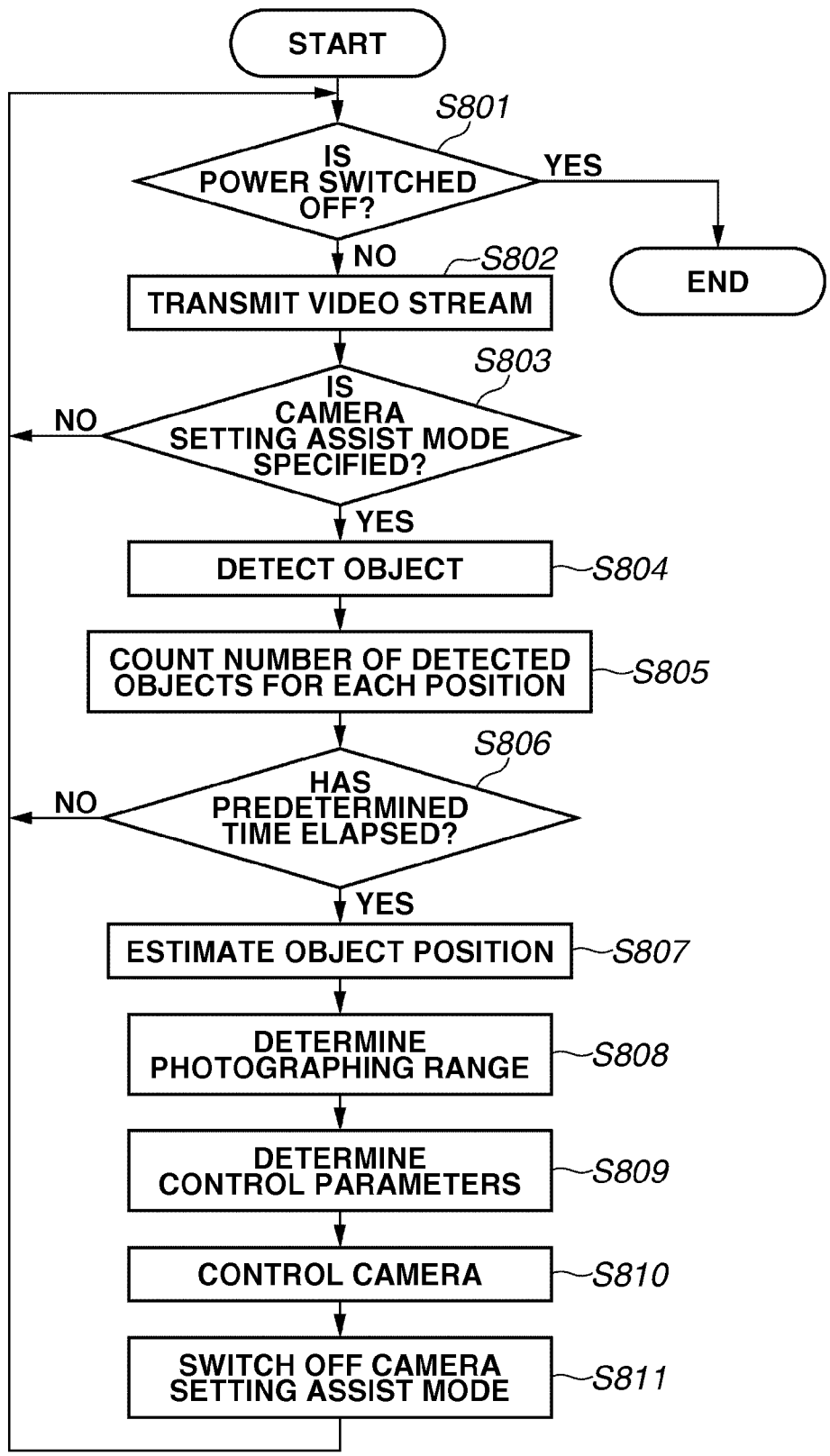
FIG. 8 illustrates a flowchart of an example of a process for performing auto-framing according to the second exemplary embodiment.

FIG. 8 illustrates a flowchart of an example of a process for performing auto-framing according to the present exemplary embodiment. Since processes performed in step S801 to step S803 are the same as those in step S401 to step S403 illustrated in FIG. 4, description on these steps is omitted. If the setting is a camera setting assist mode (YES in step S803), the process proceeds to step S804. In step S804, face detection is performed on the video image in which pan-tilt control is performed to photograph the entire range that can be photographed by the camera.

Figure 9A:
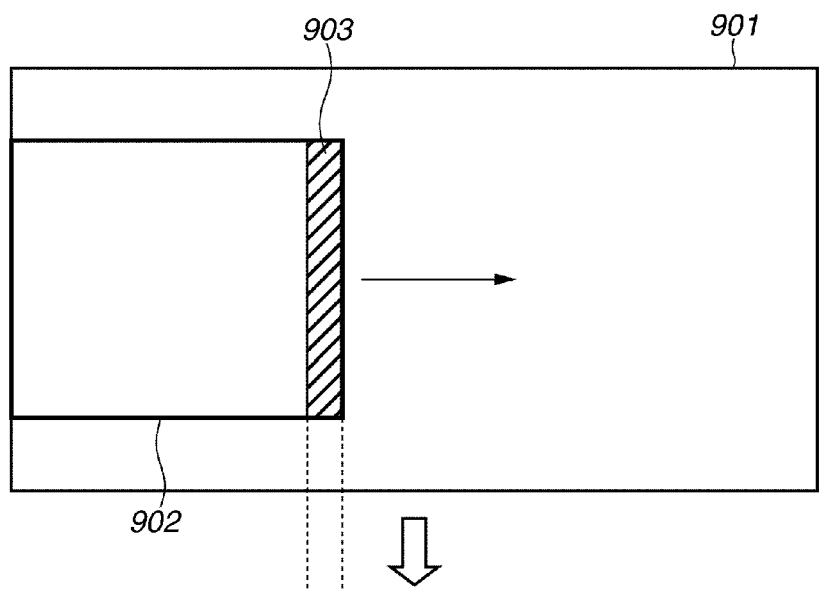
FIGS. 9A and 9B illustrate examples of a frame range when pan-tilt control is performed according to the second exemplary embodiment.
Figure 9B:
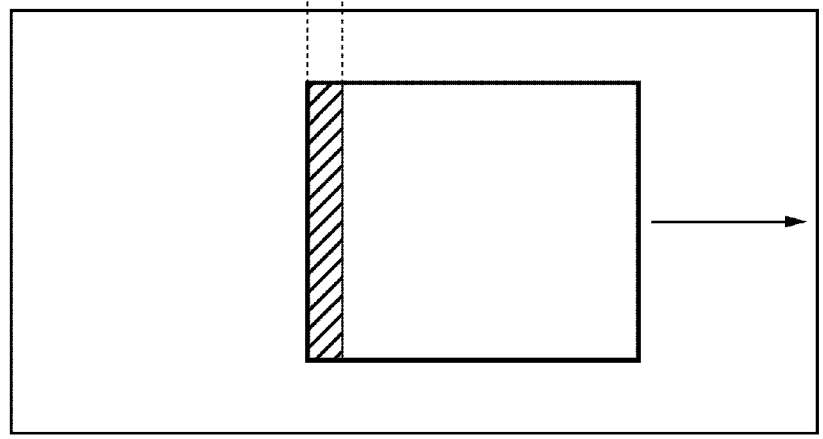

FIGS. 9A and 9B illustrate examples of the ranges of the frame when pan-tilt control is performed according to the present exemplary embodiment.

Referring to FIG. 9A, a range 901 is the entire range that can be photographed by the image processing apparatus 200 when performing panning and tilting according to the present exemplary embodiment. A range 902 is a range of the frame (at the wide-angle end).

In step S5805 illustrated in FIG. 8, the image processing apparatus 200 counts the number of detected objects at each position. If the object is photographed by panning the camera, a region 903 illustrated in FIG. 9 is photographed during a period from a state illustrated in FIG. 9A to a state illustrated in FIG. 9B. As a result, the face is detected in a predetermined region for a predetermined time, similarly as in the first exemplary embodiment.

If the entire photographing range is photographed in a raster form by panning and tilting the camera, the first line and the subsequent line may overlap depending on the angle of view of the camera. Face detection is thus performed for a longer time in such overlapped portion as compared to the other portions. In order to perform face detection under the same condition as the other portions, the overlapped portion can be less-weighted as compared to the other portions. Further, if it is difficult to move the camera at a constant angular velocity due to limitation on a motor, the pan-tilt control unit 210 can perform control so that the same position can be photographed for a longer time when the angular velocity is small. Photographing is thus performed by weighting to be proportional to the angular velocity.

Since step S806 and step S807 are the same as step S406 and step S407 illustrated in FIG. 4, description is omitted. Step S808 which is similar to step S408 is different from the first exemplary embodiment in that pan-tilt control can be performed. It is thus not necessary for the center of a photographing range 1206 illustrated in FIG. 12 to be matched with the center of the frame 1201. Therefore, the photographing range is determined by changing the center and the size of a rectangle whose aspect ratio is the same as the frame 1201 to cause the rectangle to come into contact with a side of either the first region 1204 or the second region 1205.

In step S809, the control parameter generation unit 108 determines a pan-tilt angle and the zoom position as control parameters for the photographing range to cover the entire frame. In step S810, the pan-tilt control unit 210 controls the image capturing unit 101 according to each of the pan angle and the tilt angle, and the zoom control unit 109 controls the image capturing unit 101 based on the zoom amount. Since step S811 is the same as step S411, description is omitted.

As described above, according to the present exemplary embodiment, the object position of a high probability can be acquired by continuously performing object detection during a predetermined time on the same position and acquiring the probability distribution. As a result, the load on the user is reduced even when the object cannot be temporarily detected or erroneously detected, or when the object moves, and an appropriate photographing range can be easily determined and adjusted.

A third exemplary embodiment of the present invention will be described below. The third exemplary embodiment is directed to an example of setting an object existing range (i.e., photographing range) to be cut out from the frame image and setting an enlargement rate to be applied to such object existing range. In other words, the photographing range is not controlled by performing zoom control.

Figure 10:
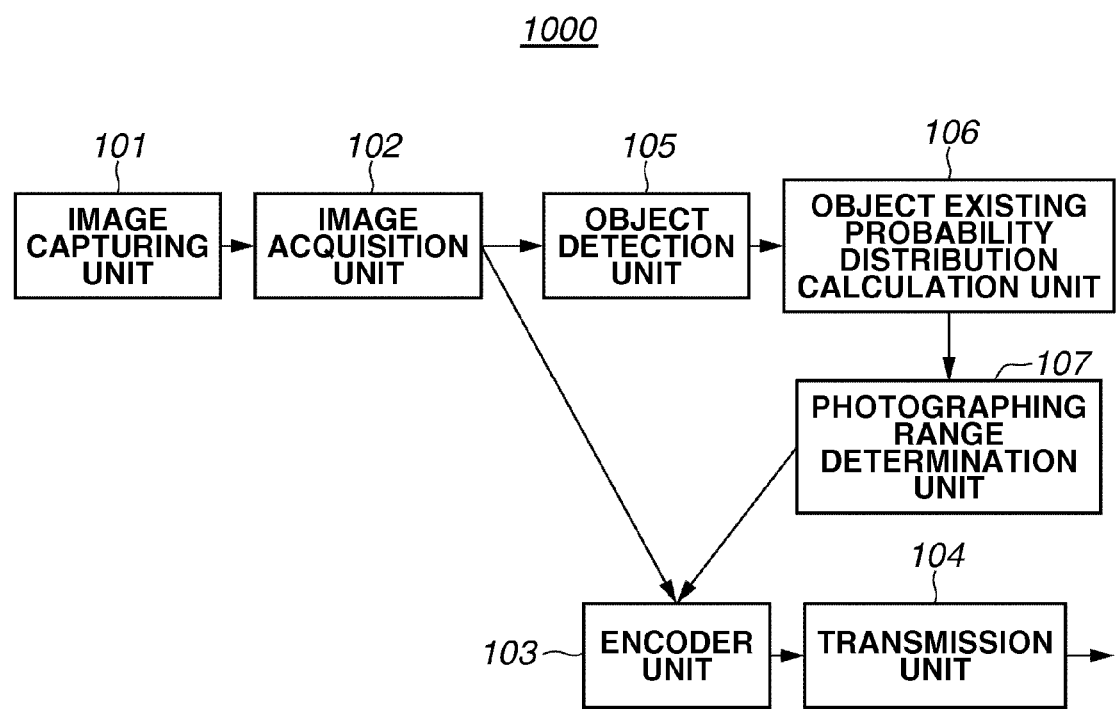
FIG. 10 illustrates a block diagram of an example of a functional configuration of the image processing apparatus according to a third exemplary embodiment of the present invention.

FIG. 10 illustrates a block diagram of an example of a function configuration of an image processing apparatus 1000 according to the third exemplary embodiment. The configuration illustrated in FIG. 10 is different from that of the first exemplary embodiment in that the zoom control unit 109 is omitted, and information such as the object existing range acquired by the photographing range determination unit 107 is input to the encoder unit 103. The configurations which are the same as the first exemplary embodiment are assigned the same reference numbers, and description is omitted.

Figure 11:
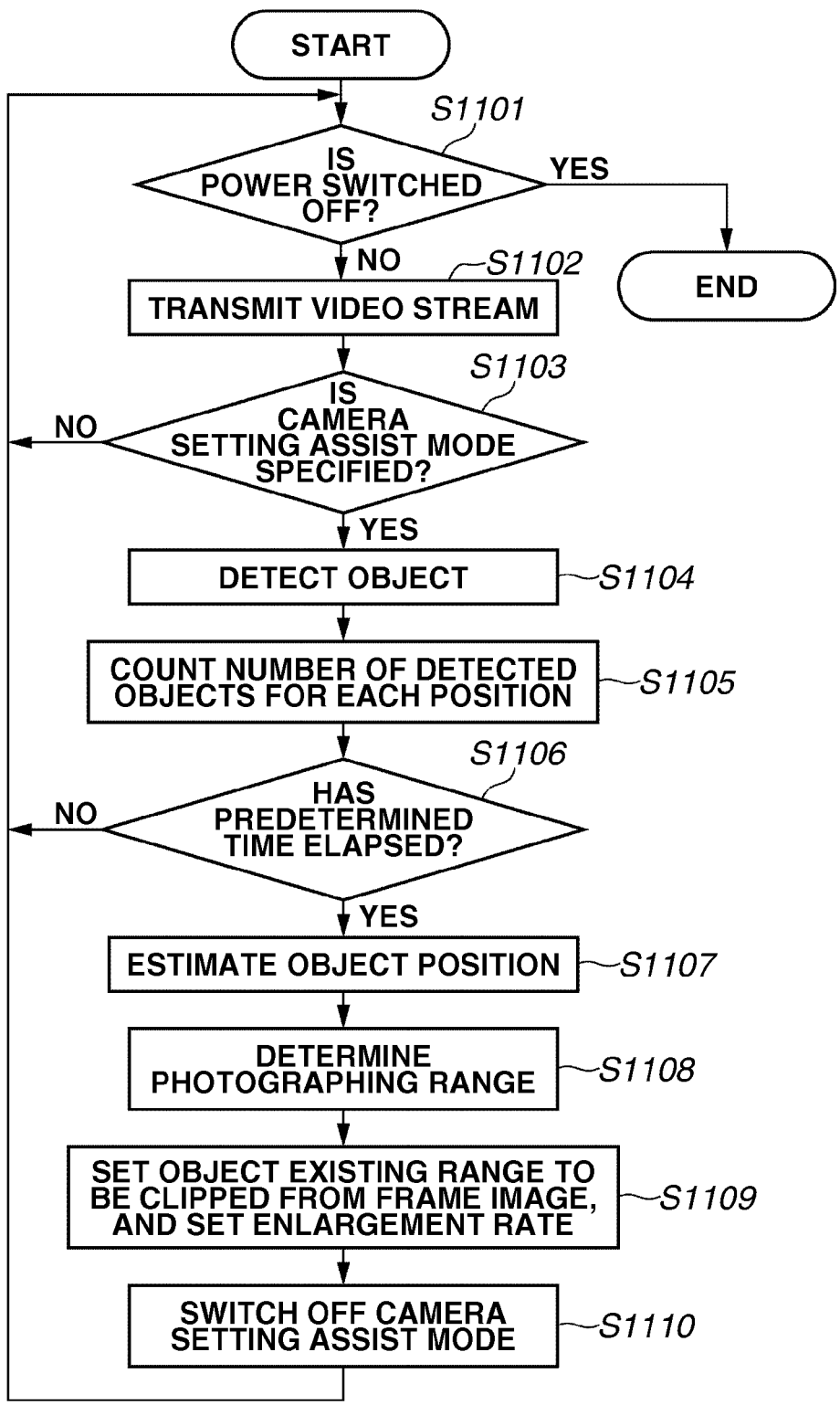
FIG. 11 illustrates a flowchart of an example of a process for performing auto-framing according to the third exemplary embodiment.

FIG. 11 illustrates a flowchart of an example of a process for performing auto-framing according to the present exemplary embodiment. Since the processes in step S1101 to step S1107 are the same as those in step S401 to step S407 illustrated in FIG. 4, description is omitted. Further, since the process of step S1108 is the same as in step S808 illustrated in FIG. 8, description will be omitted.

In step S1109, the photographing range determination unit 107 sets to the encoder unit 103 the object existing range (i.e., photographing range) and the enlargement rate of the photographing range to cover the entire frame. As a result, the encoder unit 103 cuts out the set object existing range from the frame image. Further, the encoder unit 103 enlarges the object existing range at the set enlargement rate. Since the process of step S1110 is the same as in step S411 illustrated in FIG. 4, description will be omitted.

As described above, according to the present exemplary embodiment, the object position of a high probability can be acquired by continuously performing object detection during a predetermined time on the same position and acquiring the probability distribution. As a result, the load on the user is reduced even when the object cannot be temporarily detected or erroneously detected, or when the object moves, and an appropriate photographing range can be easily determined and adjusted.

A fourth exemplary embodiment of the present invention will be described below. The fourth exemplary embodiment is directed to an example in which it is determined whether the object position is stable.

Figure 14:
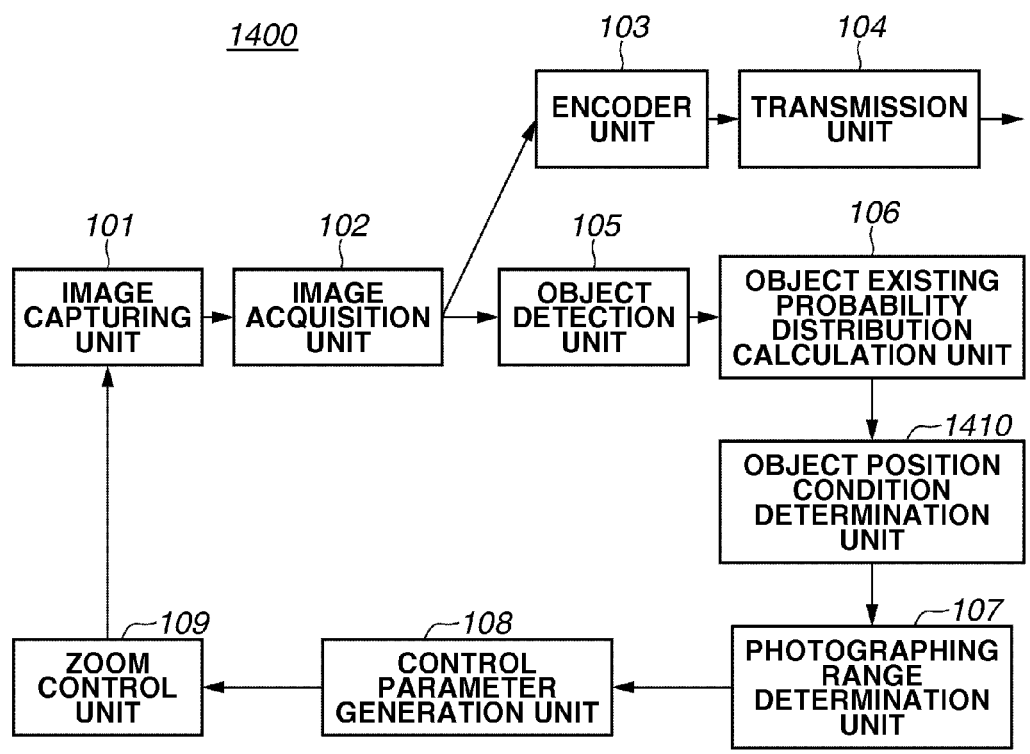
FIG. 14 illustrates a block diagram of an example of a functional configuration of an image processing apparatus according to a fourth exemplary embodiment of the present invention.

FIG. 14 illustrates a block diagram of an example of a function configuration of an image processing apparatus 1400 according to the fourth exemplary embodiment. The configuration illustrated in FIG. 14 is different from that of the first exemplary embodiment in that an object position condition determination unit 1410 is added to determine whether the object position acquired by the object existing probability distribution calculation unit 106 is stable. The configurations illustrated in FIG. 14 which are the same as the first exemplary embodiment are assigned the same reference numbers, and description is omitted.

Figure 16:
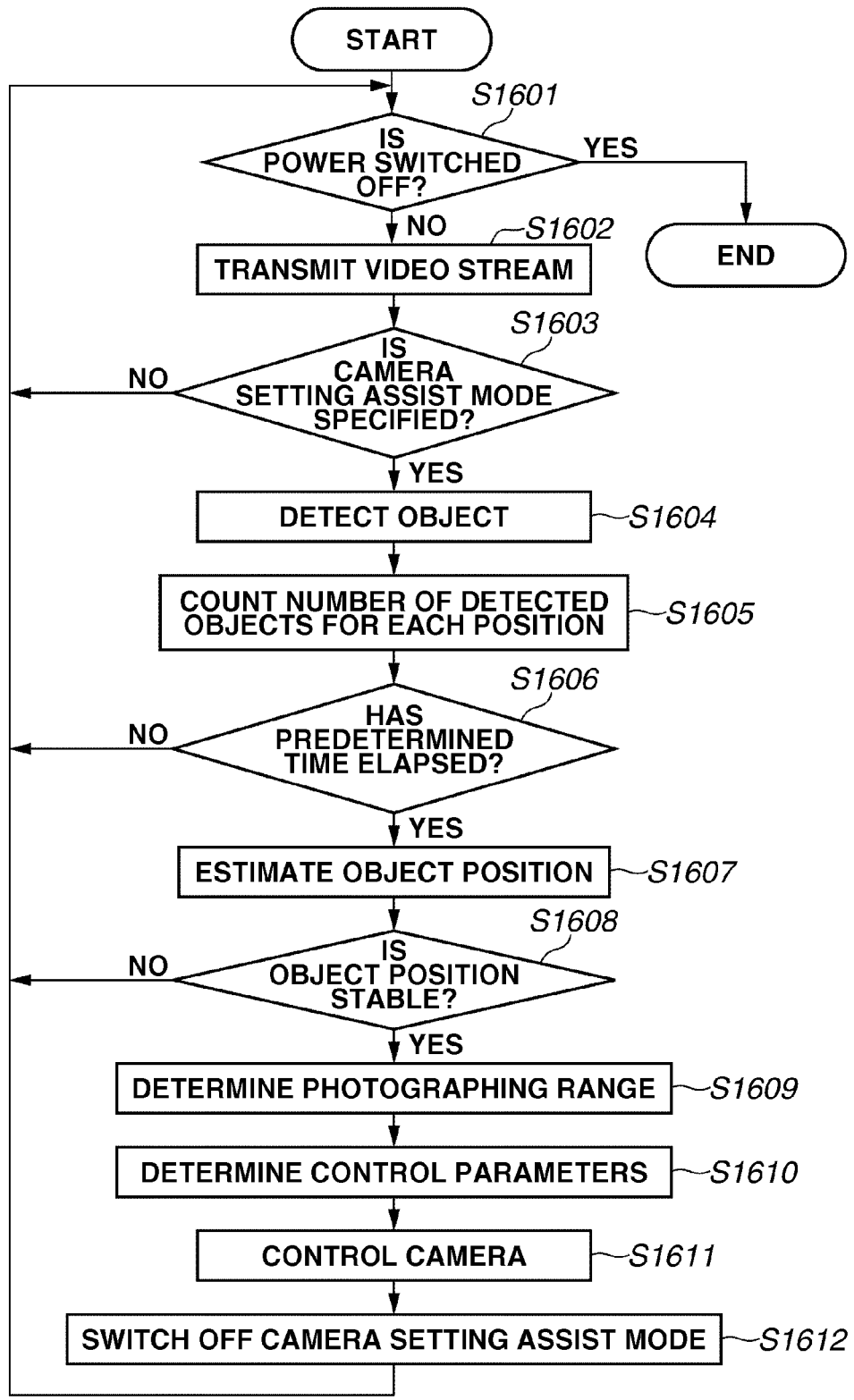
FIG. 16 illustrates a flowchart of an example of a process for performing auto-framing according to the fourth exemplary embodiment.

FIG. 16 illustrates a flowchart of an example of a process for performing auto-framing according to the present exemplary embodiment. Since the processes in step S1601 to step S1607 are the same as those in step S401 to step S407 illustrated in FIG. 4, description is omitted.

In step S1608, the object position condition determination unit 1410 determines whether the object position acquired in step S1607 is stable. As a result of the determination, if the object position is not stable (NO in step S1608), the process returns to step S1601. The processes of step S1601 to step S1607 are then repeated until it is determined that the object position is stable.

Information on the object position determined in step S1607 is temporarily stored in a random access memory (RAM, not illustrated). More specifically, the information about the object position whose probability as an object is high according to the object existing probability distribution calculated for a predetermined time set in step S1606 is stored in the RAM. A plurality of pieces of the information is stored in the RAM, and whether the object position is stable is determined using such information.

On the other hand, if the object position is stable (YES in step S1608), the process proceeds to step S1609. Since the processes in step S1609 to step S1612 are the same as those in step S408 to step S411 illustrated in FIG. 4, description is omitted.

The process of determining whether the object position is stable performed in step S1608 will be described in detail below with reference to FIGS. 20A, 20B, 20C, and 20D which illustrate an example of determining whether the object position is stable. Referring to FIGS. 20A, 20B, 20C, and 20D, frame images 2001, 2002, 2003, and 2004 each illustrate a general state of the objects for a predetermined time (i.e., time set in step S1606). Peaks 2005, 2006, 2007, and 2008 illustrate object existing probability distributions corresponding to the frame images 2001, 2002, 2003, and 2004, respectively. The object existing probability distributions illustrated in FIGS. 20A, 20B, 20C, and 20D are described one-dimensionally in the horizontal direction for ease of description. The position in the horizontal direction within the frame is indicated on the horizontal axis, and the detected number of faces within a predetermined time is indicated on the vertical axis.

In the frame image 2001 for the first 2 seconds illustrated in FIG. 20A, a conference participant on the left side 2010 is preparing for the conference and is thus facing sideways. A conference participant on the right side 2020 is facing forward and is standing instead of being seated. The peak 2005 illustrated in FIG. 20A is the object existing probability distribution corresponding to the frame image 2001. In the frame image 2002 for the next 2 seconds illustrated in FIG. 20B, the conference participant on the left side 2010 is facing front. However, the conference participant on the right side 2020 who has just sat down is preparing for the conference and is thus facing sideways. The peak 2006 illustrated in FIG. 20B is the object existing probability distribution corresponding to the frame image 2002.

In the frame image 2003 illustrated in FIG. 20C for 2 seconds from the image frame 2004 illustrated in FIG. 20B, the conference participant on the left side 2010 is preparing for the conference and is thus facing sideways. The conference participant on the right side 2020 is facing front and waiting for the conference to begin. The peak 2007 illustrated in FIG. 20C is the object existing probability distribution corresponding to the frame image 2003. In the frame image 2004 for the final 2 seconds illustrated in FIG. 20D, the conference participant on the left side 2010 and the conference participant on the left side 2010 are both facing front and waiting for the conference to begin. The peak 2008 illustrated in FIG. 20D is the object existing probability distribution corresponding to the frame image 2004.

As described above, in the final 2 seconds in which the image processing apparatus 1400 is activating, the photographing range can be correctly determined without determining the state of the object positions. In other words, it is not necessary to determine the state of the object positions under the condition that the image processing apparatus 1400 is activated just before starting the conference.

However, it is necessary for the photographing range to be correctly determined when activating the image processing apparatus at any given timing to reduce the load on the user. Therefore, in step S1608 illustrated in FIG. 16, the information about the object position acquired from the object existing probability distribution calculated for a predetermined time is stored in the RAM. Whether the object position is stable is thus determined by evaluating such plurality of numbers of object positions that are acquired periodically.

In the examples illustrated in FIGS. 20A, 20B, 20C, and 20D, the position of the peak 2005 illustrated in FIG. 20A does not match the positions of the peaks 2006, 2007, and 2008, so that the object positions are determined as unstable. On the other hand, the position of the peak 2006 illustrated in FIG. 20B matches the position of the left peak 2008 illustrated in FIG. 20D. Further, the position of the peak 2007 illustrated in FIG. 20C matches the position of the right peak 2008 illustrated in FIG. 20D. As a result, it can be determined that the two object positions are in stable conditions.

The determination criteria for the conditions of the object positions will be described below. A simple method is to acquire the matching frequency of the object positions that are detected a predetermined number of times. The position is then determined as stable if the matching frequency exceeds a threshold value. In the example illustrated in FIGS. 20A, 20B, 20C, and 20D, the object positions are detected four times and are determined to be stable if the positions match twice.

Further, a state where the participants are waiting for the conference to begin as in the frame image 2004 illustrated in FIG. 20D is a final state in which the photographing range is to be determined. In other words, the objects tend to exist in the final positions as time elapses. Object positions that are closer to the current state are thus heavily-weighted and evaluated. As a result, a stable object position can be correctly determined at the end even when there is a conference participant who does not become seated for a long time.

Furthermore, as time elapses, it becomes more likely for the number of object positions to become fixed. In the example illustrated in FIG. 20D, if the object existing probability distributions are continuously acquired from the state illustrated in the frame image 2004, peaks which are nearly the same as the peaks 2008 are acquired. The object positions as illustrated in FIG. 20D are also acquired as a result. Therefore, frame images in which the object positions and the number of object positions are fixed can be more heavily-weighted and be evaluated.

As described above, according to the present exemplary embodiment, the object position of a high probability can be acquired by continuously performing object detection during a predetermined time on the same position and acquiring the probability distribution. As a result, the load on the user is reduced even when the object cannot be temporarily detected or erroneously detected, or when the object moves. An appropriate photographing range can be easily determined and adjusted.

A fifth exemplary embodiment of the present invention will be described below. The fifth exemplary embodiment is directed to a method for determining the photographing range in a case where it is determined whether the object position is in a stable condition and the pan, tilt, and zoom control is performed.

Figure 15:
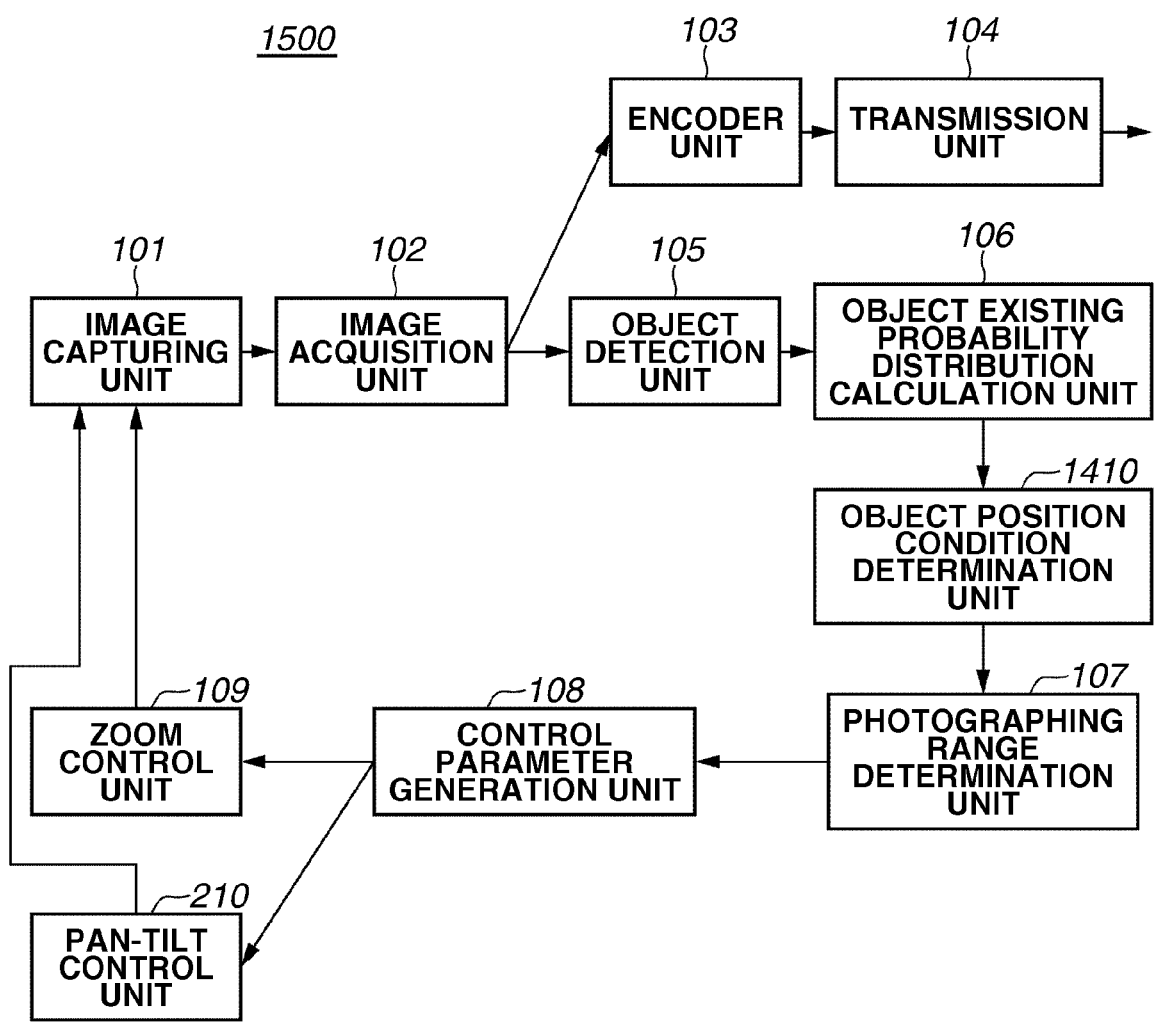
FIG. 15 illustrates a block diagram of an example of a functional configuration of an image processing apparatus according to a fifth exemplary embodiment of the present invention.

FIG. 15 illustrates a block diagram of an example of a function configuration of an image processing apparatus 1500 according to the fifth exemplary embodiment. The configuration illustrated in FIG. 15 is different from that of the fourth exemplary embodiment in that the pan-tilt control unit 210 illustrated in FIG. 2 according to the second exemplary embodiment is added. The configurations illustrated in FIG. 14 which are the same as the fourth exemplary embodiment are assigned the same reference numbers, and description is omitted.

Figure 17:
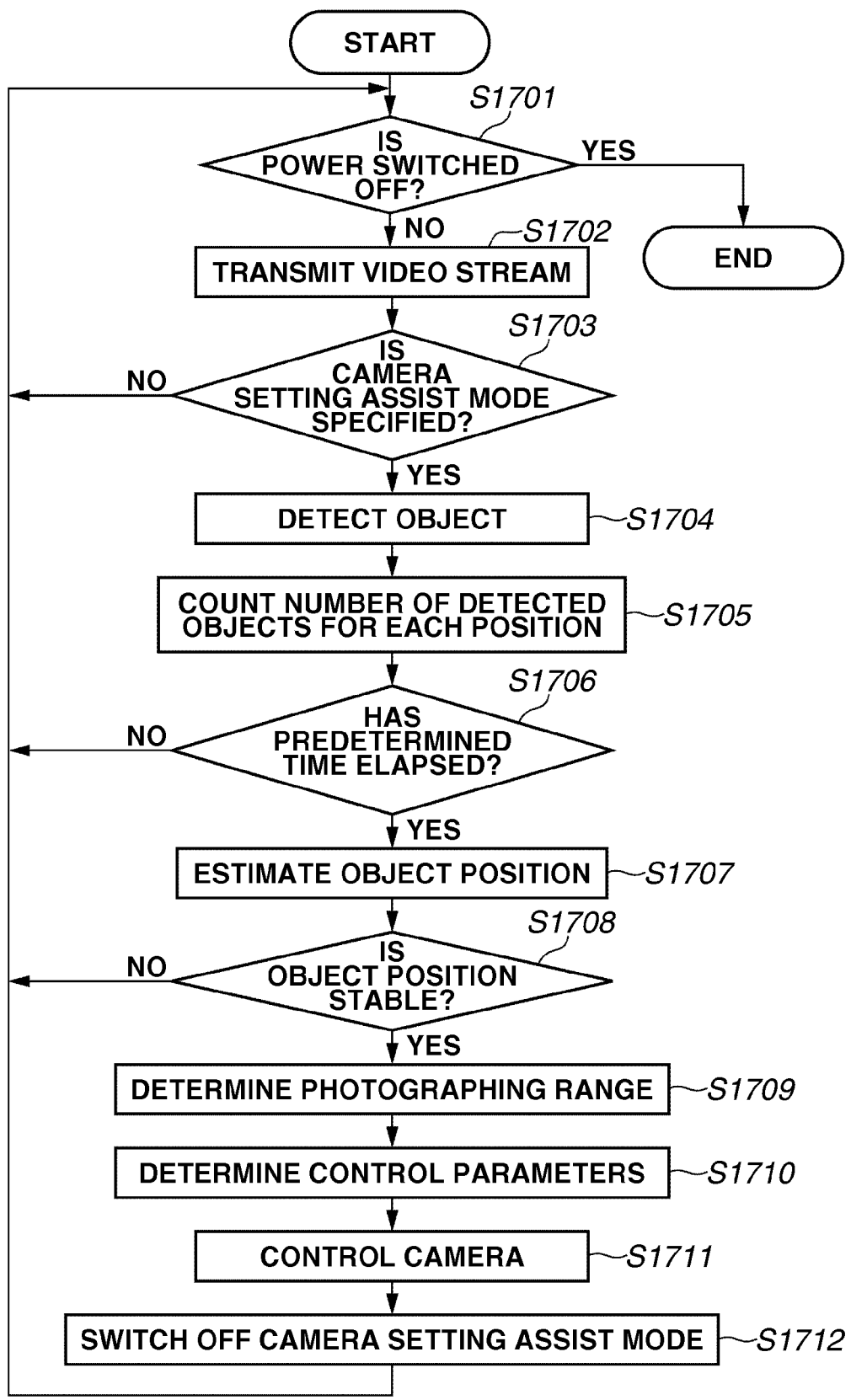
FIG. 17 illustrates a flowchart of an example of a process for performing auto-framing according to the fifth exemplary embodiment.

FIG. 17 illustrates a flowchart of an example of a process for performing auto-framing according to the present exemplary embodiment. Since the processes in step S1701 to step S1703 are the same as those in step S401 to step S403 illustrated in FIG. 4, description is omitted.

When the image processing apparatus 1500 is set to the camera setting assist mode (YES in step S1703), the process proceeds to step S1704. In step S1704, the image processing apparatus 1500 performs face detection on the video image on which pan-tilt control is being performed to photograph the entire range that can be photographed by the camera.

In step S1705, the image processing apparatus 1500 counts the number of detected objects for each position. If the conference room is photographed by panning the camera, the region 903 illustrated in FIG. 9A is photographed during the time between the state illustrated in FIG. 9A to the state illustrated in FIG. 9B. Therefore, face detection is performed on a predetermined region for a predetermined time similarly as in the fourth exemplary embodiment.

If the entire photographing range is photographed in a raster form by panning and tilting the camera, the first line and the subsequent line may overlap depending on the angle of view of the camera. Face detection is thus performed for a longer time in such overlapped portion as compared to the other portions. In order to perform face detection under the same condition as the other portions, the overlapped portion can be less-weighted as compared to the other portions. Further, if it is difficult to move the camera at a constant angular velocity due to limitation on a motor, the pan-tilt control unit 210 can perform control so that the same position can be photographed for a longer time when the angular velocity is small. Photographing is thus performed by weighting to be proportional to the angular velocity.

Since the processes of step S1706 and step S1707 are the same as in step S406 to step S407 illustrated in FIG. 4, description is omitted. The process performed in step S1708 is similar to step S1608 illustrated in FIG. 16 according to the fourth exemplary embodiment. The difference from the fourth exemplary embodiment is that pan-tilt control can be performed. As a result, it is determined whether the object position is stable similarly as in the fourth exemplary embodiment by changing the center and the size of a rectangle whose aspect ratio is the same as the frame 1201 illustrated in FIG. 12.

Since the processes of step S1709 to step S1711 are the same as in step S808 to step S810 illustrated in FIG. 8 according to the second exemplary embodiment, description will be omitted. Further, since the process of step S1712 is the same as step s411 illustrated in FIG. 4, description will be omitted.

As described above, according to the present exemplary embodiment, the object position of a high probability can be acquired by continuously performing object detection during a predetermined time on the same position and acquiring the probability distribution. As a result, the load on the user is reduced even when the object cannot be temporarily detected or erroneously detected, or when the object moves. An appropriate photographing range can be easily determined and adjusted.

A sixth exemplary embodiment of the present invention will be described below. The sixth exemplary embodiment is directed to an example in which it is determined whether the object position is in a stable condition. Further, the determined object existing range (i.e., photographing range) is cut out from the input frame image, is enlarged according to the set enlargement rate, and output.

Figure 18:
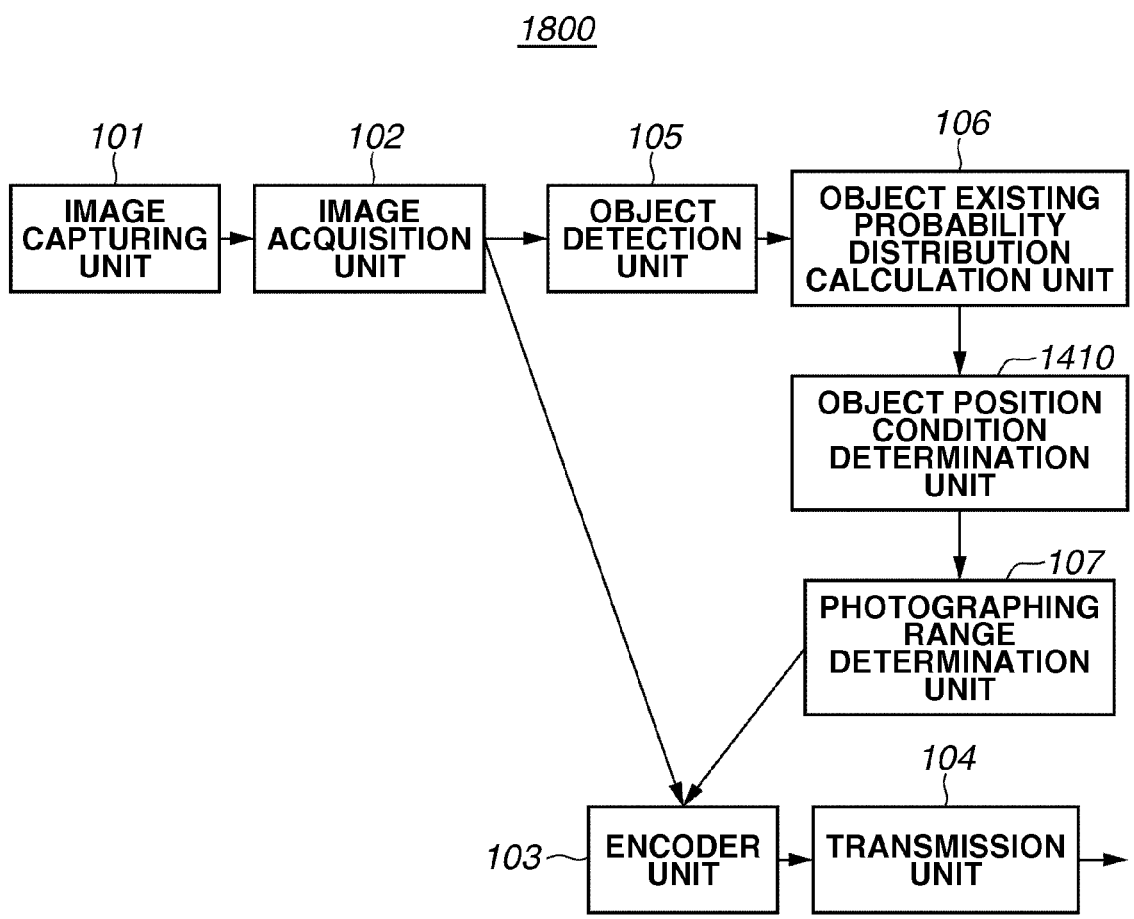
FIG. 18 illustrates a block diagram of an example of a functional configuration of an image processing apparatus according to a sixth exemplary embodiment of the present invention.

FIG. 18 illustrates a block diagram of an example of a function configuration of an image processing apparatus 1800 according to the sixth exemplary embodiment. The configuration illustrated in FIG. 18 is different from that of the fourth exemplary embodiment in that the zoom control unit 110 is omitted, and the information about the object existing range acquired by the photographing range determination unit 107 is input to the encoder unit 103. The configurations illustrated in FIG. 18 which are the same as the fourth exemplary embodiment are assigned the same reference numbers, and description is omitted.

Figure 19:
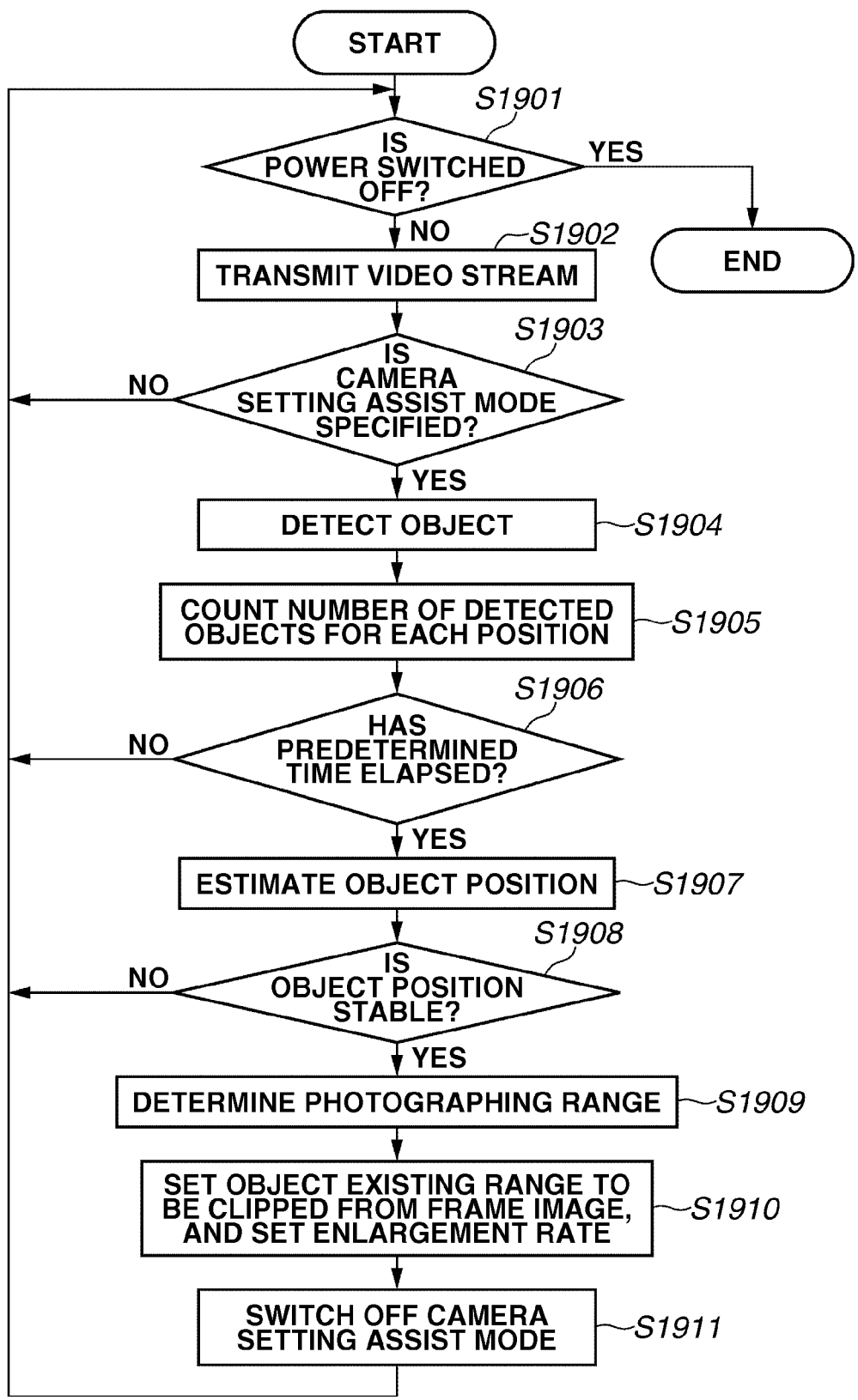
FIG. 19 illustrates a flowchart of an example of a process for performing auto-framing according to the sixth exemplary embodiment.

FIG. 19 illustrates a flowchart of an example of a process for performing auto-framing according to the present exemplary embodiment. Since the processes in step S1901 to step S1908 are the same as those in step S1601 to step S1608 illustrated in FIG. 16, description is omitted. Further, since the process of step S1909 is the same as step S1709 illustrated in FIG. 17 according to the fifth exemplary embodiment, description is omitted.

In step S1910, the photographing range determination unit 107 sets to the encoder unit 102 the object existing range (i.e., the photographing range) and the enlargement rate of the photographing range to cover the entire frame. As a result, the encoder unit 103 cuts out the set object existing range from the frame image. Further, the encoder unit 103 enlarges the cut object range using the set enlargement rate. Since the process of step S911 is the same as step S412 illustrated in FIG. 4, description is omitted.

As described above, according to the present exemplary embodiment, the object position of a high probability can be acquired by continuously performing object detection during a predetermined time on the same position and acquiring the probability distribution. As a result, the load on the user is reduced even when the object cannot be temporarily detected or erroneously detected, or when the object moves, and an appropriate photographing range can be easily determined and adjusted.

In the above-described exemplary embodiments, the face is detected in the object detection. However, the entire body or the upper body can be detected. Further, a moving body region can be detected as discussed in Japanese Patent Application Laid-Open No. 60-208184 from a difference between the background image, such as the conference room photographed without any participants, and the current frame image. If the camera can be panned and tilted, the entire range that can be photographed is photographed first to create a panorama image, which is then used as the background image.

If the moving body region detected by the difference from the background image is to be used, the detected moving region can be in any form. A center of the moving body can be used to acquire the histogram similarly as in step S405 illustrated in FIG. 4 to acquire the object existence probability distribution. Since the size of the moving body becomes necessary in determining the photographing range, a circumscribed rectangle of the moving body is acquired. The size of the moving body is then divided into several steps, and the histogram is acquired for each step.

Further, in the above-described exemplary embodiment, the center of the object (face) region is used to acquire the histogram for acquiring the object existing probability distribution as illustrated in FIG. 5. However, the method for acquiring the histogram is not limited to the above. For example, in the case of the first exemplary embodiment or the fourth exemplary embodiment, the entire photographing range which is of the same size as the frame is equally divided into 2-by-2 regions. The histogram is then acquired for an object existing in the upper left region by taking the upper-left vertex of the object region as the center. The histogram is similarly acquired when the object exists in the lower left region, the upper right region, and the lower right region. When the range which can be photographed is to be determined, the vertex near the boundary of the entire photographing range is employed. It thus becomes unnecessary to acquire histograms of object regions for each size by changing the method for acquiring the histogram as described above.

Furthermore, in the above-described exemplary embodiments, the histogram is acquired using the object existing probability distribution in which the position of the object in the horizontal direction within the frame is indicated on the horizontal axis and the detected number of faces in a predetermined time is indicated on the vertical axis. However, the present invention is not limited to the above method, and likelihood which indicates certainty of the face detection can be used. Since the likelihood indicates likeliness of the face at a position, if the likelihood continues to indicate a high value for a predetermined time, there is a high probability that the face exists. Therefore, the object existing probability distribution can be acquired by adding the likelihood acquired for each position in the frame for a predetermined time and dividing the result by time (i.e., number of frames).

Moreover, according to the above-described exemplary embodiments, it is assumed that the object region does rotate within a plane. If the object region rotates outside the plane, the circumscribed rectangle of the object region can be used. Further, according to the above-described exemplary embodiments, all the peaks in the object existing probability distribution are extracted. However, the photographing range can be determined if an object which is nearest the end of the frame can be recognized.

More specifically, the peaks are extracted from a region near the end of the frame towards the center of the frame, and if the peaks are extracted, peaks are then extracted from the opposite end of the frame towards the center of the frame. When all peaks of objects near the end of the frame are detected, the process is stopped, and the process shifts to the photographing range determination process. All processes can thus be performed in a shorter time. If the objects at both ends cannot be included in the frame, the above-described process is continued until the objects are included in the frame. The peaks at both ends near the center are then used to shift to the photographing range determination process.

Furthermore, in the above-described exemplary embodiments, all objects are included within the frame. However, the present invention can be applied to a case where not all of objects are included in the frame. For example, the photographing range can be set so that the maximum number of objects can be included or so that an object at the far left end can be included in the left end of the frame. Moreover, the photographing range can be set so that the mid position between the objects positioned at both ends becomes the center of the frame. A predetermined condition can thus be set as described above and framing can be performed to satisfy such condition. In such a case, if the user can separately determine the number of objects on the left end and the right end that are not included in the photographing range, the user can easily recognize the number of all objects.

Further, the second and fifth exemplary embodiments are directed to examples in which the entire photographing range is photographed. In a video conference, the camera is usually set so that the eyes of the participants are level with those of the participants on the other end of the video conference. The entire photographing range in the horizontal direction is thus photographed by panning the camera, and the camera is tilted only when none of the objects can be detected. The camera is again panned to photograph the photographing range in the horizontal direction, and the process is repeated until the objects can be detected.

Furthermore, in step S804 of the second exemplary embodiment and step S1704 of the fifth exemplary embodiment, face detection is performed on the video images in which the pan-tilt control in being performed. However, face detection can be sequentially performed on ranges that are acquired by dividing the entire range that can be photographed into a range of the frame photographed at the wide-angle end. More specifically, the pan-tilt control is performed on the divided ranges, and after temporarily stopping the control, the range is photographed and face detection is performed. The pan-tilt control is then performed on the next divided range, and the process is repeated.

Moreover, in the third and sixth exemplary embodiments, the photographing range determination unit 107 sets to the encoder unit 103 the photographing range within the frame image and the enlargement rate. However, the present invention is not limited to the above. The image capturing unit 101 can be configured by an image sensor such as a charge-coupled device (CCD), which can photograph a wider range than the resolution of the frame image. The image acquisition unit 102 thus acquires the image of the entire range of the image sensor inside the image capturing unit 101 instead of the frame image. The photographing range determined by the photographing range determination unit 107 is then set on the image acquisition unit 102, and the image acquisition unit 102 cuts out only the set photographing range from the entire range of the image sensor. If the cut out image does not fulfill the resolution of the frame, the image can be enlarged by the encoder unit 103.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-003663 filed Jan. 9, 2009, which is hereby incorporated by reference herein in its entirety.

What is claimed is:

1. An image processing apparatus comprising:
a photographing unit configured to generate a plurality of images by photographing a plurality of times within a first photographing range which can be photographed;
an object detection unit configured to detect at least one specified object from each of the plurality of images generated by the photographing unit;
a position determination unit configured to determine each of existing positions at which the specified object may exist based on detection results of the specified object in the plurality of images;
a distribution calculation unit configured to calculate, based on the existing positions of the specified object in the plurality of images, a probability distribution of the specified object existing within the first photographing range; and
a photographing range setting unit configured to set a second photographing range which should be used to photograph an image subsequent to the plurality of images, within the first photographing range, based on the probability distribution of the specified object existing calculated by the distribution calculation unit.

2. The image processing apparatus according to claim 1, further comprising a control unit configured to control the photographing unit to generate a frame image of the photographing range set by the range setting unit.

3. The image processing apparatus according to claim 2, further comprising a transmission unit configured to transmit the frame image of the photographing range generated by the range setting unit.

4. The image processing apparatus according to claim 2, wherein the control unit controls the photographing unit by performing pan, tilt, and zoom control.

5. The image processing apparatus according to claim 1, wherein the calculation unit calculates the object existing probability distribution by generating, with respect to object regions during a predetermined time detected by the object detection unit, a histogram of number of detected objects at respective representative positions in the object regions.

6. The image processing apparatus according to claim 5, wherein the calculation unit calculates the object existing probability distribution by generating a histogram for each size of object regions detected by the object detection unit.

7. The image processing apparatus according to claim 5, wherein the calculation unit changes a representative position in the object region according to a position of the object region detected by the object detection unit.

8. The image processing apparatus according to claim 1, wherein the calculation unit calculates the object existing probability distribution by summing a likelihood of detecting an object by the object detection unit for a predetermined time for each of a plurality of positions within a range which can be photographed.

9. The image processing apparatus according to claim 1, wherein the range setting unit extracts a peak of the object existing probability distribution and sets a photographing range based on the extracted peak.

10. The image processing apparatus according to claim 9, wherein the range setting unit extracts a peak of the object existing probability distribution and sets a photographing range so that the extracted peak satisfies a predetermined condition.

11. The image processing apparatus according to claim 9, wherein the range setting unit extracts a peak of the object existing probability distribution from both ends of the frame image towards a center of the frame image.

12. The image processing apparatus according to claim 9, further comprising a state determination unit configured to determine a state of a peak in the object existing probability distribution,
wherein the range setting unit sets a photographing range based on a peak determined to be stable by the state determination unit.

13. An image processing method comprising:
generating a plurality of images by photographing a plurality of times within a first photographing range which can be photographed;
detecting at least one specified object from each of the generated plurality of images;
determining each of existing positions at which the specified object may exist based on detection results of the specified object in the plurality of images;
calculating, based on the existing positions of the specified object in the plurality of images, a probability distribution of the specified object existing within the first photographing range; and
setting a second photographing range which should be used to photograph an image subsequent to the plurality of images, within the first photographing range, based on the calculated probability distribution of the specified object existing.

14. A computer-readable storage medium storing a program for causing a computer to execute the image processing method according to claim 13.

* * * * *